(12) United States Patent
Murasaki et al.

(10) Patent No.: US 9,888,746 B2
(45) Date of Patent: Feb. 13, 2018

(54) MOLDED SURFACE FASTENER

(71) Applicant: YKK Corporation, Tokyo (JP)

(72) Inventors: Ryuichi Murasaki, Tokyo (JP);
Tomonari Yoshida, Tokyo (JP);
Yoshitomo Iyoda, Tokyo (JP); Toshiaki Takizawa, Tokyo (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 15/119,167

(22) PCT Filed: Mar. 13, 2015

(86) PCT No.: PCT/JP2015/057567
§ 371 (c)(1),
(2) Date: Aug. 16, 2016

(87) PCT Pub. No.: WO2015/137503
PCT Pub. Date: Sep. 17, 2015

(65) Prior Publication Data
US 2017/0008435 A1    Jan. 12, 2017

(30) Foreign Application Priority Data

Mar. 13, 2014 (WO) .................. PCT/JP2014/056754

(51) Int. Cl.
*B60N 2/58* (2006.01)
*A44B 18/00* (2006.01)
*B60N 2/70* (2006.01)

(52) U.S. Cl.
CPC ........ *A44B 18/0076* (2013.01); *A44B 18/008* (2013.01); *A44B 18/0049* (2013.01);
(Continued)

(58) Field of Classification Search
CPC .............. B60N 2/5825; A44B 18/0049; A48B 18/0061
See application file for complete search history.

(56) References Cited

U.S. PATENT DOCUMENTS 5,101,539 A     4/1992  Grogan et al.
5,604,963 A *   2/1997  Akeno ............... A44B 18/0061
                                                      24/442

(Continued)

FOREIGN PATENT DOCUMENTS

JP    S63-085200       6/1988
JP    04-297202 A      10/1992
(Continued)

OTHER PUBLICATIONS

International Search Report, PCT International Application No. PCT/JP2014/056754, dated Jun. 2, 2015.
(Continued)

*Primary Examiner* — Robert Sandy
*Assistant Examiner* — David M Upchurch
(74) *Attorney, Agent, or Firm* — Kilpatrick Townsend & Stockton LLP

(57) ABSTRACT

This surface fastener has a substrate portion and a plurality of engaging elements, each of the engaging elements being provided with a stem portion standing from the substrate portion and a hook portion extending in the fastener width direction from the stem portion. The engaging element has a narrow width tip end portion provided with at least a hook portion and an enlarged width portion provided with only the stem portion, separated by a reference surface along the fastener length and height directions as a boundary. This makes an undercut hardly formable in the molding of the engaging element, and deficiencies such as deformation and the like of the engaging element can be prevented. Further, the strength of the stem portion can be increased, and a damage which a loop-shaped engaging element and the engaging element receive when the loop-shaped engaging element is attached or pulled out can be reduced.

10 Claims, 26 Drawing Sheets

(52) U.S. Cl.
CPC ........ *A44B 18/0061* (2013.01); *B60N 2/5825* (2013.01); *B60N 2/5891* (2013.01); *B60N 2/7017* (2013.01)

(56) References Cited

U.S. PATENT DOCUMENTS

| | | | | |
|---|---|---|---|---|
| 5,657,517 | A * | 8/1997 | Akeno | A44B 18/0061 24/442 |
| 5,678,286 | A * | 10/1997 | Murasaki | A44B 18/0046 24/444 |
| 5,913,482 | A * | 6/1999 | Akeno | A44B 18/0049 24/450 |
| 6,054,091 | A * | 4/2000 | Miller | A44B 18/0049 24/452 |
| 2003/0214068 | A1 | 11/2003 | Fujisawa et al. | |
| 2011/0265293 | A1 * | 11/2011 | Idrizovic | A44B 18/0061 24/452 |
| 2013/0055534 | A1 | 3/2013 | Cheng et al. | |
| 2014/0137377 | A1 * | 5/2014 | Cheng | B29C 43/46 24/449 |
| 2017/0042296 | A1 | 2/2017 | Murasaki | |

FOREIGN PATENT DOCUMENTS

| | | |
|---|---|---|
| JP | 133711/1992 | 12/1992 |
| JP | 08-126502 A | 5/1996 |
| JP | 2000-512174 A | 9/2000 |
| JP | 2004236957 | 8/2004 |
| JP | 2011143231 | 7/2011 |
| WO | 97/46129 A1 | 12/1997 |
| WO | 2003/030672 | 4/2003 |
| WO | 2012/025980 A1 | 3/2012 |
| WO | 2013061423 | 5/2013 |

OTHER PUBLICATIONS

International Search Report, PCT International Application No. PCT/JP2014/056754, dated Jun. 17, 2014.

* cited by examiner

MOLDED SURFACE FASTENER

This application is a national stage application of PCT/JP2015/057567 which claims priority to PCT/JP2014/056754, both of which are incorporated herein by reference.

TECHNICAL FIELD

The invention relates to a molded surface fastener in which a plurality of engaging elements are disposed on a flat plate-shaped substrate portion.

BACKGROUND ART

Passenger seats of automobiles or trains, various kinds of sofas, office chairs and the like are often formed by attaching a skin material such as fiber fabric or natural or synthetic leather to the surface of a cushion body (foam body) molded in a predetermined shape by using a foam resin material. The cushion body used in these various seats often has a curved surface composed of convex-concave shapes satisfying human engineering factors in order to maintain a seating posture which provides no fatigue despite long-hour seating.

Moreover, when the skin material is attached to the surface of a cushion body, after molding the cushion body in a desired shape, a method of covering and fixing the skin material to the surface of the obtained cushion body is often employed. In particular, in this case, a molded surface fastener is generally used as means for fixing the surface of the cushion body and a back surface of the skin material.

A molded surface fastener has a configuration in which a plurality of engaging elements (for example, male engaging elements) are disposed on one surface (first surface) of a base portion made of a thermoplastic resin, and such a molded surface fastener is integrated so that the engaging elements are exposed to the surface of the cushion body when the cushion body is molded. Moreover, a plurality of female engaging elements configured to be fastened to the engaging elements of the molded surface fastener are formed on the rear surface of the skin material that covers the cushion body.

After the skin material is covered on the cushion body to which the molded surface fastener is integrated, the female engaging elements (loop-shaped engaging elements) disposed on the back surface of the skin material are pressed against the male engaging elements of the molded surface fastener disposed to the surface of the cushion body, whereby the skin material is fastened to the molded surface fastener. In this manner, the skin material is easily fixed to the surface of the cushion body along the convex-concave shapes of the surface, and the skin material is prevented from floating from the cushion body.

Such an example of the molded surface fastener integrated to the cushion body to fix the skin material is disclosed in International Publication 2012/025980 (Patent Document 1) and the like.

For example, a molded surface fastener 80 described in Patent Document 1 has, as shown in FIG. 35, a long and flat plate-shaped substrate portion 81, left and right barrier portions 82 disposed on left and right side edge portions of the substrate portion 81, a plurality of hook-shaped engaging elements 83 disposed between the left and right barrier portions 82, a magnetic material holding portion 84 disposed inside the barrier portion 82, a lateral wall portion 85 disposed along a width direction, and fin piece portions 86 extending from the left and right side edges of the substrate portion 81 toward the outside in the width direction. Moreover, a linear magnetic material 87 is integrally molded to the molded surface fastener 80 in a state to be held by the magnetic material holding portion 84 along a length direction.

The engaging elements 83 in Patent Document 1 are disposed at a predetermined pitch in a line in the length direction (a fastener length direction) of the substrate portion 81, and the five lines of the engaging elements 83 are arranged in the width direction. Moreover, each engaging element 83 has a raising portion erected from a surface of the substrate portion 81 and a hook-shaped engaging head portion (hook portion) curving and extending toward front and rear in the fastener length direction at an upper end of the raising portion, and is formed as a so-called male engaging element 83.

The left and right barrier portions 82 have three lines of vertical wall portions disposed along the length direction and connecting portions connecting between the adjacent vertical wall portions. Each line of vertical wall portions has a plurality of vertical wall bodies disposed at a predetermined pitch intermittently in the length direction. Each vertical wall body has a post portion erected from the substrate portion 81 and an upper surface portion disposed on an upper end of the post portion. Each upper surface portion is formed so as to hang over from the upper end of the post portion in the length and width directions.

Each vertical wall has such an upper surface portion, whereby in attaching the molded surface fastener 80 closely to a cavity surface of a molding die, the adhesion of the molded surface fastener 80 can be stronger by increasing the adhesion area between the vertical wall portion of the molded surface fastener 80 and the cavity surface of the molding die.

Such a molded surface fastener 80 in Patent Document 1 is manufactured by using a manufacturing apparatus 90, for example shown in FIG. 36.

The manufacturing apparatus 90 has a die wheel 91 rotated drivingly in one direction (the counterclockwise direction in the Figure), a continuous extrusion nozzle 92 which extrudes molten resin and is disposed opposing to a circumferential surface of the die wheel 91, a pickup roll 93 disposed on a downstream side of the continuous extrusion nozzle 92 in a rotation direction of the die wheel 91, a pair of upper and lower pressing rolls 94, 95 which are disposed on the downstream side of the pickup roll 93 and have a heating part, and a linear magnetic material supply part, not shown in the Figures, which is disposed on an upstream side of the continuous extrusion nozzle 92 in the rotation direction of the die wheel 91 so as to supply the linear magnetic material 87 between the opposing surfaces of the die wheel 91 and the continuous extrusion nozzle 92.

A cavity space 91a for molding the barrier portion 82, the engaging element 83, the lateral wall portion 85 and the magnetic material holding portion 84 of the molded surface fastener 80 is formed on the circumferential surface of the die wheel 91. Generally, the die wheel 91 is formed columnar by laminating a plurality of discoidal plates having a necessary thickness in a rotation axis direction of the die wheel 91. Further, a predetermined cavity space 91a corresponding to a position of a predetermined discoidal plate is formed on the peripheral part of that discoidal plate by electric discharge machining or laser processing.

For example, in the die wheel 91, the cavity space 91a corresponding to a form of the vertical wall portion is formed at a predetermined pitch in a circumferential direction on a peripheral part of a discoidal plate disposed on a position corresponding to the vertical wall portion of the barrier portion 82. Further, the cavity space 91a corresponding to a form of the engaging element 83 is formed at a predetermined pitch on a peripheral part of a discoidal plate disposed on a position corresponding to a row of the engaging elements 83 along the length direction. Then, the die wheel 91 is formed by laminating the plates of which the cavity space 91a are and are not formed on the peripheral parts in an axis direction in a predetermined order.

In a case of manufacturing the molded surface fastener 80 by using the manufacturing apparatus 90 having such a die wheel 91, the molten resin material is extruded from the continuous extrusion nozzle 92 continuously to the circumferential surface of the die wheel 91 in the first place. At this time, the die wheel 91 is rotated drivingly in one direction, and at the same time as the molten resin extruded to the circumferential surface of the die wheel 91 molds the substrate portion 81 of the molded surface fastener 80 continuously at the space between the continuous extrusion nozzle 92 and the die wheel 91, the barrier portion 82, the engaging element 83, the lateral wall portion 85 and the magnetic material holding portion 84 are molded in the above-mentioned each molding cavity serially.

In this case, the barrier wall portion 82, the engaging element 83 and the like are molded on the substrate portion 81 along a direction (hereinafter, a direction in which the molded surface fastener 80 is molded is referred to as "machine direction") in which the molded surface fastener 80 is molded (i.e. along a length direction of the molded surface fastener 80). At the same time as the molten resin material is extruded from the continuous extrusion nozzle 92, the linear magnetic material 87 is supplied from the linear magnetic material supply part, not shown in the Figures, to the extrusion position of the molten resin and molded integrally to the molded surface fastener 80.

The molded surface fastener 80 molded on the circumferential surface of the die wheel 91 is solidified by making a half turn while being held on the circumferential surface of the die wheel 91 and cooled. After that, the molded surface fastener 80 is continuously peeled off from the circumferential surface of the die wheel 91 by the pickup roll 93.

Then, the molded surface fastener 80 peeled off from the die wheel 91 is carried between the upper and lower pressing rolls 94, 95. And an upper end part of the vertical wall body of the molded surface fastener 80 is pressed by the pressing rolls 94, 95 from the upper and lower directions, whereby a flat upper surface part is formed at the upper end of the post portion. Due to this, the molded surface fastener 80 of Patent Document 1 in which the engaging head portion (hook portion) of each engaging element 83 is formed along the fastener length direction as shown in FIG. 35 is manufactured.

On the other hand, for example in Japanese Patent Publication No. 2000-512174 (Patent Document 2), a method for manufacturing a molded surface fastener in which an engaging head portion (hook portion) of each engaging element is formed along a fastener width direction perpendicular to a fastener length direction is described as an example of methods for manufacturing a molded surface fastener.

Also in a case of manufacturing the molded surface fastener in which the engaging head portion has an engaging element in the fastener width direction, a die wheel which is formed by laminating a plurality of discoidal plates having a necessary thickness in an axis direction and a molding cavity molding the engaging element and the like on the circumferential surface is disposed on is used. In this case, since the molded engaging element is formed along a direction (hereinafter "machine intersect direction") perpendicular to a machine direction (i.e. along a width direction of the molded surface fastener), a cavity space for molding one engaging element is formed over a plurality of discoidal plates of the die wheel.

For example, in Patent Document 2, the cavity space 99 for molding one engaging element is formed over plate a-plate k laminated each other at the circumferential surface of die wheel 98 as shown in FIG. 37. The cavity space 99 for one engaging element is formed over a plurality of plates a-k as above, whereby the molded surface fastener, in which a plurality of engaging elements in which the hook portion is directed to the fastener width direction are disposed on the substrate portion can be manufactured.

PRIOR ART DOCUMENTS

Patent Documents

Patent Document 1: International Publication No. 2012-025980

Patent Document 2: Japanese Patent Publication No. JP 2000-512174

SUMMARY OF INVENTION

Problem to be Solved by the Invention

In a case of manufacturing the molded surface fastener having a plurality of engaging elements in which the hook portion is directed to the fastener width direction, the cavity space 99 molding one engaging element is formed over a plurality of discoidal plates a-k in the die wheel, as shown in FIG. 37.

In the meantime, the die wheel for molding a molded surface fastener is formed generally by laminating a plurality of discoidal plates, and the cavity space having a predetermined form corresponding to the form of the engaging element or other portions is formed on the peripheral part of each discoidal plate by electric discharge machining (wire electric discharge machining) or laser processing, as described above.

Though, in a case of forming the cavity space having a predetermined form on the discoidal plate by electric discharge machining or laser processing, position misalignment of the cavity space formed on each plate or error in a dimension of the cavity space occurs easily if an apparatus with high processing accuracy is not used, since the form of the molded part of the engaging element and the like is very small. On the other hand, if an apparatus with high processing accuracy is used, there occurs such a problem as an increase in the manufacturing cost.

In addition, in a case of forming the die wheel by laminating a plurality of discoidal plates in which a cavity space with a predetermined form is formed on the peripheral part, there is a possibility that the discoidal plate is laminated in a state that the position is misaligned in a plate circumferential direction with respect to other discoidal plates.

Therefore, in a case of manufacturing the molded surface fastener by using the die wheel in which the cavity space 99 molding one engaging element is formed over a plurality of discoidal plates a-k as shown in FIG. 37, a convex-concave part as an undercut is formed on the cavity surface of the cavity space 99, if the position misalignment or the dimension error of the cavity space 99 occurs in forming the cavity space 99 on the discoidal plates a-k, or the discoidal plates are laminated in a state that the position of more than one discoidal plates is misaligned in a plate circumferential direction, as described above. Here, the undercut means the form with which molded products can not be brought out from the mold (demolded) smoothly only in a mold-opening direction when these products are demolded from the molding die in the molding process.

For example, in assuming a case that a position of the cavity surface of plate e is misaligned as shown by the imaginary line in FIG. 37, the part at which the position of the cavity surface of plate e is misaligned protrudes with respect to the cavity surface of plate f and becomes the undercut.

Therefore, if the molded surface fastener by using such a die wheel having such a cavity space is manufactured, the deficiencies occur by such cases that the molded engaging element can not be demolded from the cavity space, a part of the engaging element is cut or torn off, the engaging element is deformed, and further strength of the engaging element is deteriorated by these incidents, which deteriorates quality of the molded surface fastener.

The present invention is invented in the light of the above problems, and its specific object is to provide a molded surface fastener in which a hook portion of an engaging element is extended along a fastener width direction (machine intersect direction), and has a shape able to mold an engaging element with a predetermined strength stably without making damage or deformation occurred in demolding from a cavity space even if a position misalignment or a dimension error of the cavity space occurs in forming the cavity space on discoidal plates of a die wheel, or the discoidal plates are laminated in a state that a position of the discoidal plates are misaligned in a plate circumferential direction.

Means for Solving the Problem

To achieve the above object, a molded surface fastener provided by the present invention includes, as a basic configuration, a flat plate-shaped substrate portion extending in a fastener length direction and a plurality of hook-shaped engaging elements disposed on at least one surface of the substrate portion, each engaging element being provided with a stem portion standing from the substrate portion and a hook portion extending from a side surface of the stem portion to one direction of a fastener width direction, wherein the engaging element has a narrow width tip end portion provided with at least the hook portion and an enlarged width portion provided with only the stem portion, separated by a reference surface along the fastener length and height directions as a boundary, and a dimension of the narrow width tip end portion in the fastener length direction is smaller than a dimension of the enlarged width portion in the fastener length direction at the boundary, as a most principal configuration.

In particular, in the molded surface fastener of the present invention, it is preferable that the boundary is disposed in the fastener width direction within a range from a compartment position comparting the stem portion and the hook portion to an end edge position opposite to the extending direction of the hook portion at a top end surface of the stem portion.

In addition, it is preferable that the boundary is disposed on the compartment position comparting the stem portion and the hook portion, the whole stem portion is formed by the enlarged width portion, and the whole hook portion is formed by the narrow width tip end portion.

Further, it is preferable that the reference surface is formed by a flat surface and disposed on both front and rear sides of the engaging element in the fastener length direction. In this case, it is preferable that the reference surface is disposed on both upper and lower sides of the engaging element in the height direction, and a height position of the top end surface of the narrow width tip end portion is lower than a height position of the top end surface of the enlarged width portion via the boundary.

In the molded surface fastener of the present invention, it is preferable that the stem portion is formed to decrease a dimension in the fastener width direction gradually toward the top end surface.

Moreover, it is preferable that a lower end surface of the hook portion is disposed having an angle of 0° or more and 50° or less with respect to the surface of the substrate portion.

In the molded surface fastener of the present invention, it is preferable that the hook portions of all the engaging elements disposed on one substrate portion extend from the stem portion to the same direction in the fastener width direction.

Moreover, it is preferable that one hook portion or a plurality of hook portions is/are disposed on one stem portion.

Further, the molded surface fastener of the present invention preferably has a first surface fastener portion having the substrate portion and a plurality of engaging elements, a second surface fastener portion having the substrate portion and a plurality of engaging elements, and a foldable piece portion which connects between the first surface fastener portion and the second surface fastener portion and has flexibility to be able to fold with respect to the first surface fastener portion and the second surface fastener portion. The hook portion of each engaging element disposed on the first surface fastener portion and the hook portion of each engaging element disposed on the second surface fastener portion preferably extend from the stem portion toward the foldable piece portion side respectively.

Effects of the Invention

The molded surface fastener of the present invention has a substrate portion which is long in the fastener length direction (machine direction) and a plurality of engaging elements disposed on at least one surface of the substrate portion, and each engaging element has a stem portion standing from the substrate portion and a hook portion extending along the fastener width direction (machine intersect direction) from a side surface (end surface) along the fastener length direction of the stem portion.

The engaging element has an enlarged width portion disposed on one side of the fastener width direction and provided with only the stem portion, and a narrow width tip end portion which is disposed on the other side of the fastener width direction so that a dimension in the fastener length direction (element width dimension) is smaller than that of the enlarged width portion and provided with at least a hook portion, separated by a reference surface (boundary surface) along the fastener length direction and the height direction of the engaging element as a boundary. In particular, the element width dimension of the narrow width tip end portion of the engaging element at the boundary is formed smaller than that of the enlarged width portion. In this case, the boundary between the enlarged width portion and the narrow width tip end portion is disposed at a position corresponding to a parting line between the discoidal plates in the die wheel along the height direction of the engaging element.

Owing to such a molded surface fastener as the present invention, even if the position misalignment or the dimension error of the cavity space occurs on each discoidal plate of the die wheel in forming the cavity space, or a plurality of plates are laminated in a state that the position of the plate is misaligned in the circumferential direction of the plate, the position misalignment or the dimension error of the cavity space, or the lamination misalignment in the circumferential direction of the plate as described above can be compensated by the reference surface formed at the boundary since the element width dimensions of the engaging element are made to be different between at one side and the other side in the fastener width direction via the boundary formed to correspond to the parting line.

Owing to this, the undercut perpendicular to the fastener width direction (machine intersect direction) caused by the position misalignment of the cavity space and the like is hardly formed on the die wheel. Therefore, when the molded surface fastener having such a shape as above is molded by using the die wheel, the deficiencies caused by the formation of the undercut resulting from such cases that the engaging element can not be demolded from the cavity space, a part of the engaging element is cut or torn off, the engaging element is deformed, and further the strength of the engaging element is deteriorated by these incidents hardly occur. As a result, each engaging element can be provided with a predetermined form stably, followed by the stable quality of the molded surface fastener and the cost reduction by improvement of the yield rate.

Moreover, since the whole hook portion of the engaging element is formed of the narrow width tip end portion whose element width dimension is small, in such a case for example as the molded surface fastener of the present invention is attached to a side wall portion of a groove portion formed on the cushion body and loop-shaped engaging element disposed on a skin material of the cushion body is engaged with the molded surface fastener as explained in the embodiments later, the narrow hook portion can be easily inserted to the loop-shaped engaging element, whereby the molded surface fastener can easily and stably engage with and fix to the female engaging element having a counterpart loop-shaped engaging element. Further, when the counterpart loop-shaped engaging element is detached from the hook-shaped engaging element of the present invention, the loop-shaped engaging element can be easily detached since the elastic deformation of the hook portion whose element width dimension is small becomes easy.

In the present invention, a boundary which makes the element width dimension change between the enlarged width portion and the narrow width tip end portion is set in the fastener width direction arbitrarily within the range from a compartment position comparting the stem portion and the hook portion to the end edge position opposite to an extending direction of the hook portion at the top end surface of the stem portion. The position of the boundary is set as above, whereby the formation of the undercut can be prevented and the discoidal plate can be easily and stably processed in processing the discoidal plate for molding the engaging element in the die wheel.

Particularly in the present invention, the boundary between the enlarged width portion and the narrow width tip end portion is disposed along the compartment position comparting the stem portion and the hook portion. In this case, the whole stem portion in the engaging element is formed of the enlarged width portion and the whole hook portion is formed of the narrow width tip end portion extending from the enlarged width portion via the boundary.

Since the stem portion is formed thick and strong owing to the above, even if tension is applied to the skin material in a state that the hook-shaped engaging element of the present invention engages with the counterpart loop-shaped engaging element, the counterpart loop-shaped engaging element can be stably supported by the thick stem portion and withstand. In addition, deformation or damage of the hook-shaped engaging element (particularly stem portion) supporting the loop-shaped engaging element can hardly occur. Further, since the whole stem portion is formed of the enlarged width portion and the whole hook portion is formed of the narrow width tip end portion, an appearance of the engaging element becomes well and the appearance quality of the molded surface fastener can be improved.

In the engaging element of the molded surface fastener of the present invention, the reference surface disposed at the boundary is formed of a flat surface, and this reference surface is disposed on both front and rear sides of the engaging element in the fastener length direction. The boundary has such a front and rear reference surfaces, whereby various kinds of deficiencies caused by the formation of the undercut can be effectively prevented and the quality of the molded surface fastener can be more stable in molding the molded surface fastener by using the die wheel, even if the position misalignment or the dimension error of the cavity space, or the lamination misalignment occurs as described above.

Moreover, in the engaging element of the present invention, the reference surface disposed at the boundary is disposed on both upper and lower sides of the engaging element in the height direction. In this case, the height position of the top end surface of the narrow width tip end portion formed parallel to an upper surface of the substrate portion is set to be lower than the height position of the top end surface of the enlarged width portion via the boundary. Owing to this, when the molded surface fastener is molded by using the die wheel having a plurality of discoidal plates, several deficiencies caused by the formation of the undercut as described above can be effectively prevented since the undercut in the height direction of the engaging element can be hardly formed on the parting line between the plates even if the position misalignment or the dimension error of the cavity space occurs. It should be noted that, in the present invention, the top end surface of the narrow width tip end portion in the engaging element may be set at the same height position as the one of the top end surface of the enlarged width portion.

Further in the engaging element of the present invention, the stem portion is formed to decrease the dimension in the fastener width direction gradually toward the top end surface. The engaging element is formed as above, whereby in molding the molded surface fastener by using the die wheel, the engaging element can be easily demolded from the cavity space of the die wheel since the sloped surface decreasing the dimension of the stem portion in the fastener width direction gradually becomes a draft.

Further in the molded surface fastener of the present invention, the angle formed by the lower end surface of the hook portion and the surface of the substrate portion is set to be 0° or more and 50° or less. Owing to this, when the molded surface fastener engages with the counterpart female engaging member, the hook portion of the hook-shaped engaging element of the present invention can be easily inserted to the loop-shaped engaging element, and when the female engaging member engaged with the molded surface fastener of the present invention is disengaged, the hook portion of the hook-shaped engaging element of the present invention can be easily pulled out from the loop-shaped engaging element. As a result, the ease for using the molded surface fastener (usability) can be improved, and the work efficiency to engage or disengage the different members (for example, cushion body and skin material) by using the molded surface fastener can be increased.

Moreover, as described above, since the hook portion of the hook-shaped engaging element of the present invention is easy to be pulled out from the loop-shaped engaging element, the damage which the hook portion of the hook-shaped engaging element and the loop-shaped engaging element receive mutually can be suppressed. Therefore, the durability of the molded surface fastener of the present invention and the counterpart female engaging member can be increased In the molded surface fastener of the present invention, the hook portions of all the engaging elements disposed on one substrate portion extend from the stem portion to a same direction of the fastener width direction. Owing to this, when the molded surface fastener engages with the female engaging member having a plurality of loop-shaped engaging elements, the hook portion of the engaging element of the present invention can be easily inserted to the loop-shaped engaging element by moving the loop-shaped engaging element from the extending direction side of the hook portion to the opposite side along the fastener width direction with respect to the molded surface fastener, and the female engaging member can be smoothly engaged with the molded surface fastener of the present invention.

Further, even if the female engaging member is pulled to the opposite side to the extending direction of the hook portion after the female engaging member is engaged with the molded surface fastener of the present invention, the engaging state between the molded surface fastener and the female engaging member can be stably maintained. On the other hand, by moving the female engaging member to the extending direction of the hook portion along the fastener width direction after the female engaging member is engaged with the molded surface fastener of the present invention, the hook portion of the engaging element of the present invention can be easily pulled out from the loop-shaped engaging element, and the molded surface fastener and the female engaging member can be smoothly disengaged.

Moreover, in the molded surface fastener of the present invention, one hook portion or a plurality of hook portions may be provided on one stem portion. Since one hook portion or a plurality of hook portions is/are disposed on one stem portion, the female engaging member having a plurality of loop-shaped engaging elements can be stably engaged with the molded surface fastener of the present invention.

Furthermore, the molded surface fastener of the present invention has a first surface fastener portion having the substrate portion and a plurality of engaging elements, a second surface fastener portion having the substrate portion and a plurality of engaging elements, and a foldable piece portion which connects between the first surface fastener portion and the second surface fastener portion and has flexibility to be able to fold with respect to the first surface fastener portion and the second surface fastener portion. The hook portion of each engaging element disposed on the first surface fastener portion and the hook portion of each engaging element disposed on the second surface fastener portion extend from the stem portion toward the foldable piece portion side respectively.

The molded surface fastener having such a shape as above is preferably used, as explained in the embodiments later, particularly in such a case that the molded surface fastener is attached to the side wall portion of the groove portion formed on the cushion body, then the loop-shaped engaging element disposed on the skin material of the cushion body is inserted into the groove portion of the cushion body and is engaged with the molded surface fastener.

In other words, in foam molding the cushion body as described above by using the molding die, the molded surface fastener as above can hold the foldable piece portion of the molded surface fastener in a state to be folded with respect to the first and second surface fastener portion on the tip end surface of the fastener holding portion disposed on the molding die (first holding portion) and hold the first and second surface fastener portion of the molded surface fastener adhered to the side wall portion of the fastener holding portion (second holding portion). Owing to this, the molded surface fastener can be stably held at a predetermined position with respect to the molding die by using the foldable piece portion as a positioning portion.

In addition, by foam molding the cushion body in a state that the molded surface fastener is held at the fastener holding portion of the molding die as described above, the first surface fastener portion and second surface fastener portion of the molded surface fastener can be disposed on the left and right side wall portions of the groove portion formed on the cushion body in a state that the hook-shaped engaging element is exposed in the groove portion. Therefore, the molded surface fastener can stably fasten to the skin material having a plurality of loop-shaped engaging elements by securing the desirable engaging force by the engaging element.

DESCRIPTION OF EMBODIMENT

Hereinafter, preferred embodiments of the present invention are described in detail with Embodiments referring to drawings. It should be noted that the present invention is not limited thereto, and various changes can be made as long as they have a substantially same structure and same functional effects. For example, in the Embodiments below, a number, a disposing position and an attaching pitch of hook-shaped engaging element disposed on a surface fastener portion is not limited in particular, and can be changed arbitrarily.

Embodiment 1

Figure 1:
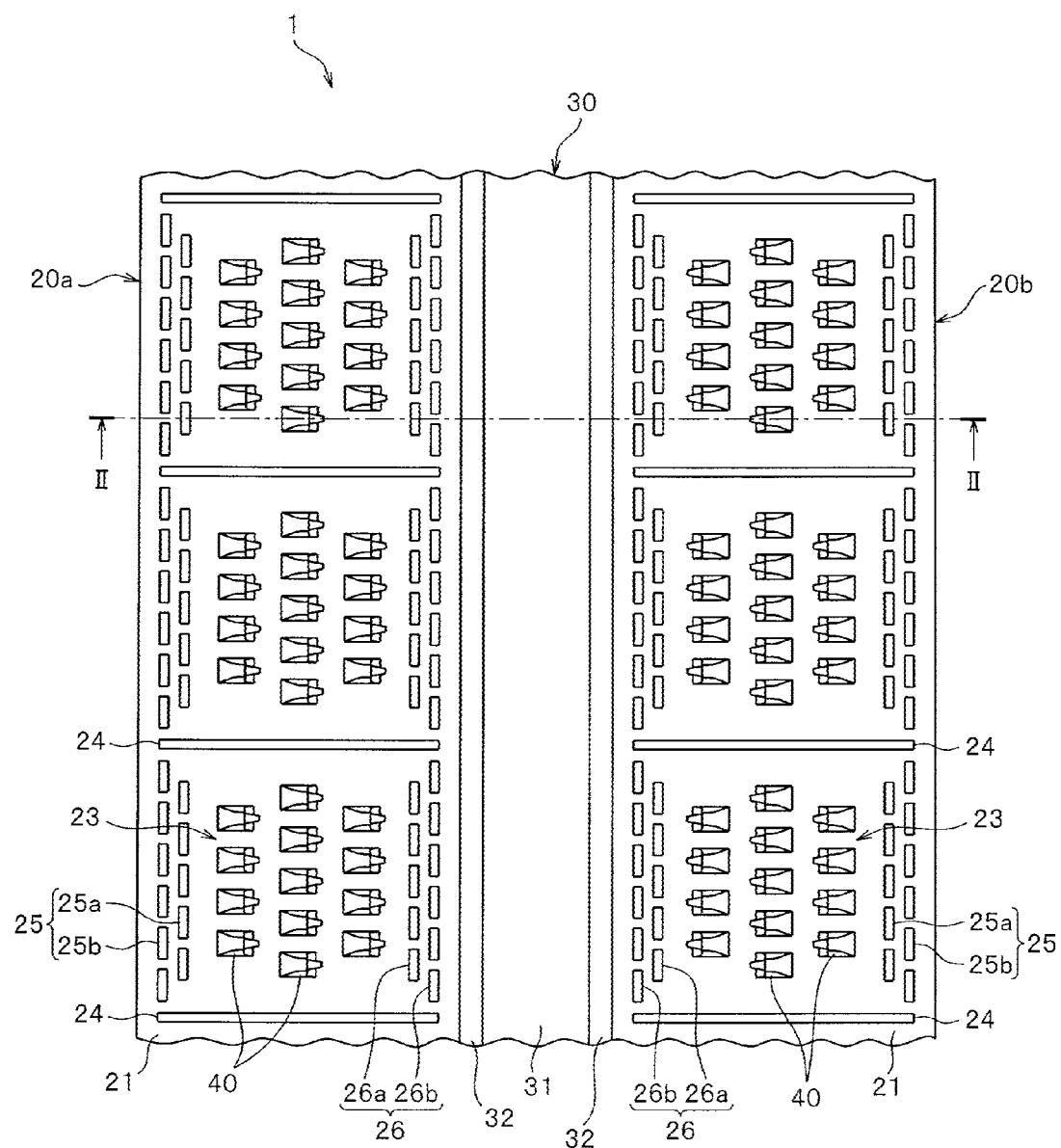
FIG. 1 is a plan view illustrating a molded surface fastener according to Embodiment 1 of the invention.
Figure 2:
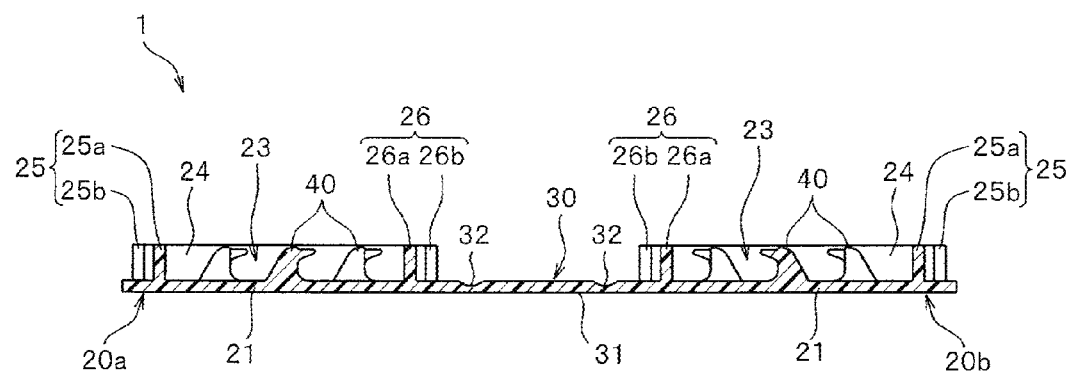
FIG. 2 is a cross-sectional view in II-II line shown in FIG. 1.
Figure 3:
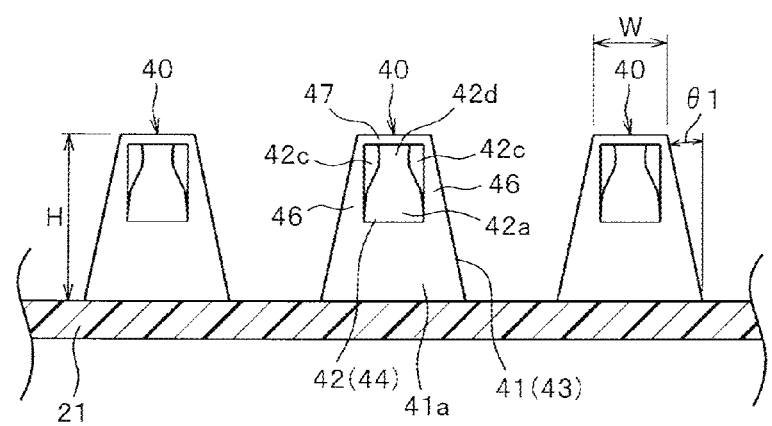
FIG. 3 is an enlarged view of the engaging element of the molded surface fastener viewing from a hook portion side.
Figure 4:
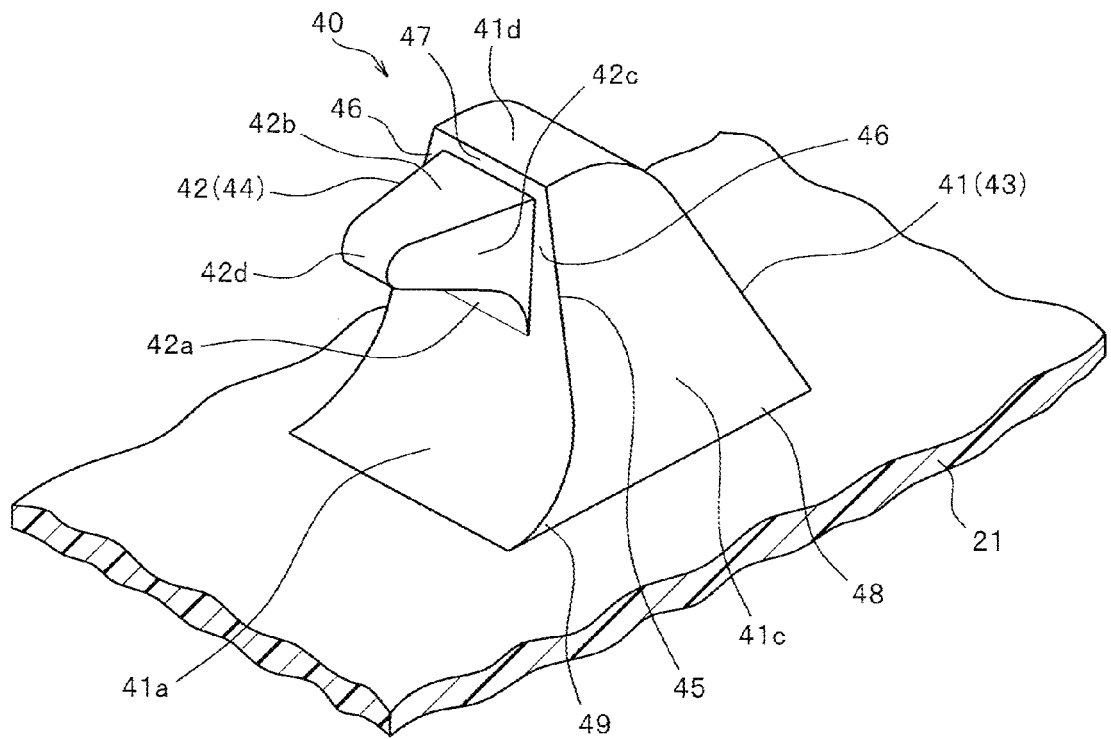
FIG. 4 is a perspective view of the engaging element viewing from a perspective direction of the hook portion side.
Figure 5:
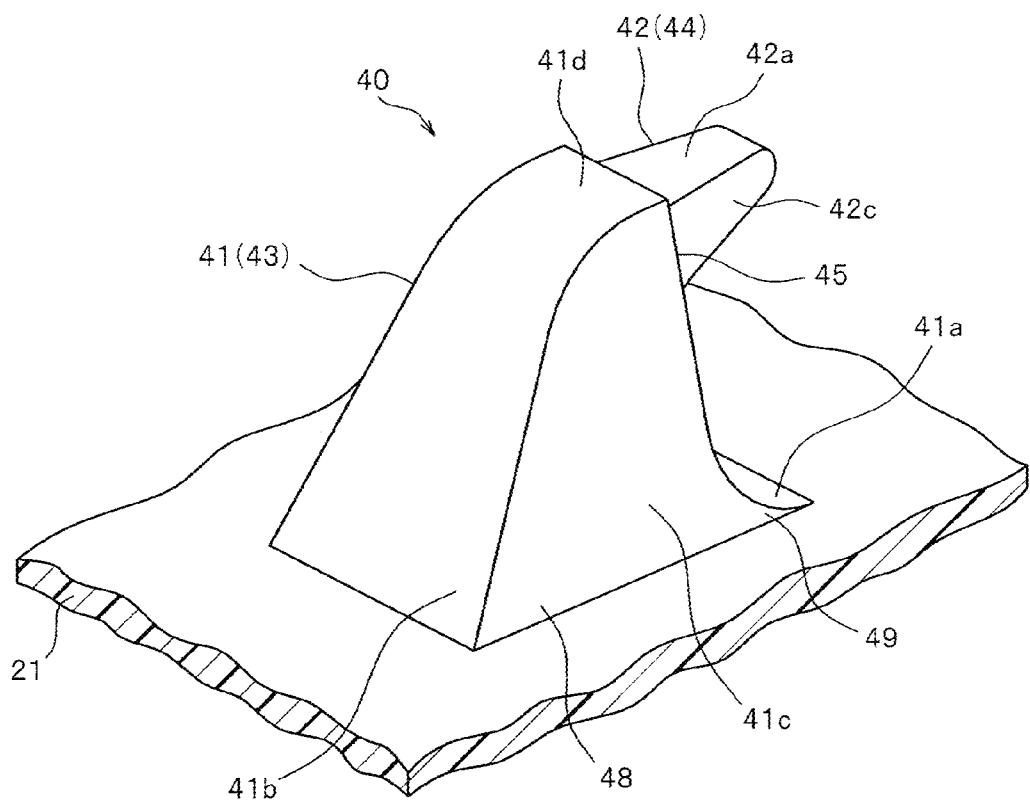
FIG. 5 is a perspective view of the engaging element viewing from a perspective direction of the opposite side to the hook portion side.
Figure 6:
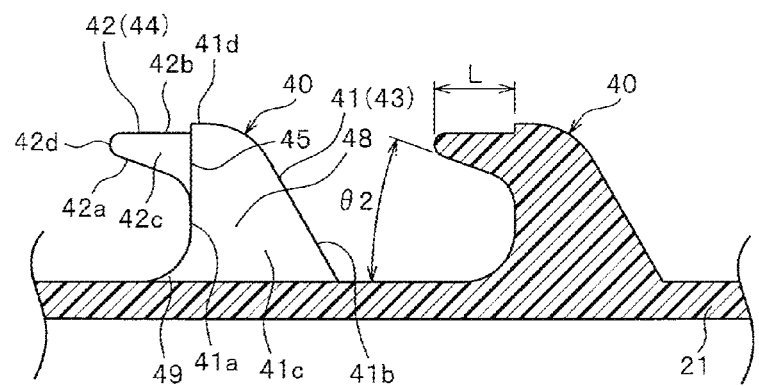
FIG. 6 is a main part cross-sectional view of a main part of the molded surface fastener shown as the cross-section perpendicular to a fastener length direction.

FIG. 1 shows a plan view of a molded surface fastener according to Embodiment 1 of the present invention. FIG. 2 is a cross-sectional view in II-II line shown in FIG. 1. FIG. 3 is an enlarged view of the engaging element of the molded surface fastener viewing from the hook portion side. FIGS. 4 and 5 are perspective views of the engaging element. FIG. 6 is a cross-sectional view of a main part of the molded surface fastener shown as the cross-section perpendicular to a fastener length direction.

It should be noted that, in the following explanation, a fastener length direction or a front and rear direction regarding a molded surface fastener means a direction along a direction in which the molded surface fastener is molded continuously in the process of molding the molded surface fastener (machine direction). In particular, a direction which becomes an upper side means the front direction and an opposite direction thereto means the rear direction viewing FIG. 1. In other words, it can be said that the fastener length direction means, in a cushion body to which the molded surface fastener is integrated, the same direction as a length direction of a groove portion for fixing a skin material formed on a surface of the cushion body. In this case, the length direction of a groove portion for fixing a skin material means a direction perpendicular to a groove width direction and a groove depth direction of the groove portion for fixing a skin material.

In the molded surface fastener, it can be said that a fastener width direction or a left and right direction means a direction perpendicular to the fastener length direction as well as a direction along a substrate portion of the molded surface fastener. Or, it can be also said that it is a machine intersect direction perpendicular to the machine direction. In particular, directions which become left side and right sides viewing FIG. 1 mean the left direction and right direction, respectively.

In the molded surface fastener, a fastener height direction or an upper and lower direction means a direction perpendicular to the fastener length direction as well as a direction perpendicular to the substrate portion of the molded surface fastener. In particular, a direction which becomes a near side of the figure sheet means upper and an opposite direction thereto means lower viewing FIG. 1

The molded surface fastener 1 in Embodiment 1 shown in FIG. 1 is manufactured, as explained later, by molding a material that a magnetic material (magnetic particles) is mixed in a thermoplastic resin by using an manufacturing apparatus 50 having a die wheel 51, and is formed long in the machine direction of the manufacturing apparatus 50 (a direction in which the molded surface fastener is carried).

It should be noted that, in the present invention, though the material of the molded surface fastener is not limited in particular, the materials having an elastic force such as thermoplastic resins like polyester, nylon and polypropylene, or a composition that a thermoplastic elastomer is contained in above these thermoplastic resins can be used.

The molded surface fastener 1 in Embodiment 1 has a first surface fastener portion 20*a* which is disposed on a left side and is long in a fastener length direction (machine direction), a second surface fastener portion 20*b* which is disposed on a right side and is long in the fastener length direction, and a foldable piece portion 30 disposed between the first and second surface fastener portions 20*a*, 20*b* continuously.

In Embodiment 1, the first surface fastener portion 20*a* and the second surface fastener portion 20*b* have a symmetrical form mutually with reference to a center part of the foldable piece portion 30 in the width direction when the first and second surface fastener portions 20*a*, 20*b* and the foldable piece portion 30 are held in a straight and linear form along the width direction.

Accordingly, regarding the first and second surface fastener portions 20*a*, 20*b* in Embodiment 1, the first surface fastener portion 20*a* disposed on the left side of the foldable piece portion 30 is mainly explained. Regarding the other portion, i.e. the second surface fastener portion 20*b*, the detailed explanation is not described but represented with the same reference signs as the ones in the first surface fastener portion 20*a*.

In Embodiment 1, the first surface fastener portion 20*a* extends from a left side edge part of the foldable piece portion 30 in the fastener width direction. This first surface fastener portion 20*a* has a flat plate-shaped substrate portion 21, a plurality of hook-shaped male engaging elements 40 standing on an upper surface (a first surface) of the substrate portion 21 and form an engaging region 23, lateral barrier portions (first barrier portions) 24 standing within the engaging region 23 of the substrate portion 21 along the width direction, outer side vertical barrier portion (second barrier portion) 25 standing on an end edge part opposite to the foldable piece portion 30 side of the substrate portion 21 (outer side end edge portion) along the length direction, and inner side vertical barrier portion (third barrier portions) 26 standing on an end edge portion (inner side end edge portion) on the foldable piece portion 30 side of the substrate portion 21 along the length direction.

The substrate portion 21 of the first surface fastener portion 20*a* has a thin flat plate-shaped form with a thickness appearing as a rectangular shape when the first surface fastener portion 20*a* is viewed from upper or lower side (from the height direction side). A plate thickness of the whole substrate portion 21 is set to be a constant size.

In Embodiment 1, the upper surface (first surface) and a lower surface (second surface) of the substrate portion 21 is formed to be a flat surface. It should be noted that, in the present invention, a plurality of concave groove portions or convex rib portions parallel to each other can be provided on the lower surface of the substrate portion 21, for example. By providing such a plurality of concave groove portions or convex rib portions as above, when the molded surface fastener 1 is integrated in foam molding of the cushion body (foam body) 10 as explained later (see FIG. 14), the adherence strength of the molded surface fastener 1 to the cushion body 10 can be increased by the larger contact area between the lower surface of the substrate portion 21 of the molded surface fastener member and the cushion body 10.

Each engaging element 40 disposed on the first surface fastener portion 20*a* has, as shown in FIGS. 3-6, a stem portion 41 standing from the upper surface of the substrate portion 21 upward and a hook portion 42 extending from an upper side of a side surface of the stem portion 41 along the fastener width direction.

The stem portion 41 has an inner side surface 41*a* which is disposed under the hook portion 42 and directs to an extending direction of the hook portion 42, an outer side surface 41*b* which is disposed on an opposite side to the inner side surface 41*a* of the stem portion 41 and directs to an outer side end edge portion side of the substrate portion 21, front and rear end surfaces 41*c* facing to the fastener length direction and an upper end surface (tip end surface) 41*d* which is disposed on the upper end part of the stem portion 41 and faces upward. And a bottom surface connected to the substrate portion 21 of the stem portion 41 is formed to be an approximately rectangular shape.

Here, the upper end surface (tip end surface) 41*d* of the stem portion 41 means a surface disposed at the most distant position from the substrate portion 21 and facing upward. In this case, the upper end surface 41*d* of the stem portion 41 is disposed at a position higher than a height position of the upper end of the hook portion 42. It should be noted that in a case where the upper end surface of the stem portion is formed on, for example, one continuous surface to the upper end surface of the hook portion 42 without a step or a bend, the upper end surface of the stem portion means a surface of an stem portion side disposed on the same height position as the one of the upper end surface of the hook portion or a surface of a part forming a single flat surface with the upper end surface of the hook portion in the stem portion.

A maximum value H of a dimension from the bottom surface to the upper end surface 41*d* of the stem portion 41 in the fastener height direction becomes a dimension of the engaging element 40 in the height direction (height dimension). In Embodiment 1, the height dimensions H of all the engaging elements 40 are set to be a constant size of 0.3 mm or more and 3.5 mm or less, preferably 0.45 mm or more and 2.0 mm or less.

Further in this case, the height dimension H of the engaging element 40 in Embodiment 1 is set to be the same size as the height dimensions of the lateral barrier portion 24, the outer side vertical barrier portion 25 and the inner side vertical barrier portion 26. Owing to this, in the foam molding process of the cushion body 10 as explained later, when the molded surface fastener 1 is held at the fastener holding portion 15*a* of the molding die 15, the upper surfaces of each barrier portion 24-26 of the first and second surface fastener portions 20*a*, 20*b* can be adhered to the fastener holding portion 15*a* stably without being blocked by the engaging element 40. It should be noted that, in the present invention, the height dimension H of the engaging element 40 may be set to be smaller than the height dimension of the lateral barrier portion 24, the outer side vertical barrier portion 25 and the inner side vertical barrier portion 26 of the molded surface fastener 1.

The inner side surface 41*a* of the stem portion 41 has a first inner side surface disposed on a lower end part of the stem portion 41 and formed to be a concaved-surface shape and a second inner side surface extending upward continuously from the first inner side surface and formed to be a flat-surface shape parallel to the upper and lower direction. It should be noted that, in the present invention, whole inner side surface 41a disposed under the hook portion 42 may be formed to be a concaved-surface shape or a flat-surface shape.

The outer side surface 41b of the stem portion 41 is formed to be a flat-surface shape sloped to the hook portion 42 side with respect to the upper and lower direction, and decreases a dimension of the stem portion 41 in the fastener width direction (element length dimension) gradually upward. Here, the dimension of the stem portion 41 in the fastener width direction means the dimension between the outer side surface 41b of the stem par 41 and the inner side surface 41a of the stem portion 41, as well as the first and second reference surfaces (first and second boundary surfaces) 46, 47 formed along the boundary 45 explained later in the fastener width direction.

The front end surface 41c and the rear end surface 41c of the stem portion 41 are formed to be a symmetrical flat surface mutually with reference to a center position of the stem portion 41 in the fastener length direction. The front end surface 41c and the rear end surface 41c of the stem portion 41 are formed to slope with respect to the height direction (upper and lower direction) so as the dimension of the stem portion 41 in the fastener length direction (element width dimension) to be decreased gradually upward.

In this case, as shown in FIG. 3, a slope angle θ1 with respect to the upper and lower direction of the front end surface 41c and the rear end surface 41c of the stem portion 41 is set to be 5° or more and 20° or less, preferably 10° or more and 15° or less. The slope angle θ1 is set to be 5° or more (particularly 10° or more), whereby a draft by which the molded surface fastener 1 in Embodiment 1 is demolded from the die wheel 51 can be stably formed.

Further, the slope angle θ1 is set to be 20° or less (particularly 15° or less), whereby it is prevented that the element width dimension at the upper end part of the stem portion 41 becomes too small, and the strength of the stem portion 41 can be stably secured. It should be noted that, in Embodiment 1, the element width dimension W at the upper end part of the stem portion 41 is set to be 0.1 mm or more and 3.0 mm or less, preferably 0.2 mm or more and 2.0 mm or less.

The hook portions 42 of all the engaging elements 40 disposed on the first surface fastener portion 20a extend in the same direction from the upper end part of the stem portion 41 to the foldable piece portion 30 side along the fastener width direction. In this case, the hook portion 42 extends from a part lower than the height position of the tip end surface of the stem portion 41 to the fastener width direction via the second reference surface 47. It should be noted that the hook portions 42 of all the engaging elements 40 disposed on the second surface fastener portion 20b also extend in the same direction from the upper end part of the stem portion 41 to the foldable piece portion 30 side along the fastener width direction.

Therefore, the extending direction of the hook portions 42 of all the engaging elements 40 disposed on one substrate portion 21 of the first surface fastener portion 20a and the extending direction of the hook portions 42 of all the engaging element 40 disposed on one substrate portion 21 of the second surface fastener portion 20b are the opposite directions in which the hook portions 42 face each other.

In the engaging element 40 of Embodiment 1, a dimension L of the hook portion 42 in the fastener width direction, i.e. the dimension L from the stem portion 41 to the tip of the hook portion 42 in the fastener width direction is set to be 0.2 mm or more and 3.0 mm or less, preferably 0.3 mm or more and 1.5 mm or less.

The hook portion 42 in Embodiment 1 has a lower end surface 42a formed from the inner side surface 41a of the stem portion 41 smoothly and continuously, an upper end surface 42b disposed parallel to the upper surface of the substrate portion 21, front and rear end surfaces 42c facing to the fastener length direction and a tip end surface 42d formed to be a curved surface shape on the tip end portion of the hook portion 42. Here, the hook portion 42 of the engaging element 40 means a part having a lower end surface 42a which becomes a surface opposing to the upper surface of the substrate portion 21. That is, such a surface as opposing to the upper surface of the substrate portion 21 is not formed on the stem portion 41 of the engaging element 40. In the present invention, regarding the engaging element 40, the hook portion 42 means a part which extends from the stem portion 41 in the fastener width direction and has a surface opposing to the upper surface of the substrate portion 21.

This tip end surface 42d of the hook portion 42 is formed to be a curved surface and continuously from the upper end surface 41d to the lower end surface 42a. The hook portion 42 is formed so that the dimension in the height direction between the upper end surface 42b and the lower end surface 42a in the hook portion 42 (height dimension) decreases gradually from a base end portion connecting to the stem portion 41 in the hook portion 42 to the hook tip end.

In this case, the lower end surface 42a of the hook portion 42 has a first lower end surface formed to be a concaved-surface shape and continuously from the inner side surface 41a of the stem portion 41 and a second lower end surface formed to be a flat-surface shape continuously from the first lower end surface to the tip end surface 42d of the hook portion 42. The surface shape of the lower end surface 42a is different from the one of a conventional hook-shaped engaging element described in the above-mentioned Patent Document 1 and Patent Document 2, for example.

That is, in the conventional hook-shaped engaging element described in Patent Document 1 and Patent Document 2, the surface shape of the lower end surface in the hook portion is formed so that an intermediate part of the hook portion is the most concaved to hold the loop-shaped engaging element easily. And the tip end portion of the hook portion is disposed on a height position lower than the intermediate part of the hook portion.

On the other hand, in the engaging element 40 in Embodiment 1, as explained later, a counterpart loop-shaped engaging element is held basically at the stem portion 41. Therefore, the lower end surface 42a of the hook portion 42 is not formed so that the intermediate part of the hook portion 42 is the most concaved as conventional, but formed so that the height position of the lower end surface 42a becomes gradually higher (or so as to be the same height) toward the tip end portion from the base end portion of the hook portion 42. In this case, the flat-surface shaped second lower end surface 42a in the hook portion 42 in Embodiment 1 is disposed so that an angle θ2 formed with respect to the upper surface of the substrate portion 21 is 0° or more and 50° or less, preferably 10° or more and 35° or less.

By forming the hook portion 42 having such a lower end surface 42a as above, as explained later, when the molded surface fastener 1 in Embodiment 1 engages with the female engaging member 13 having a plurality of loop-shaped engaging elements 13a (for example, see FIG. 14), the hook portion 42 of the engaging element 40 in Embodiment 1 can be easily inserted to the loop-shaped engaging element 13a. Further, when the female engaging member 13 engaged with the molded surface fastener 1 in Embodiment 1 is moved to the fastener width direction with respect to the molded surface fastener 1 and disengaged, the hook portion 42 of the engaging element 40 can be easily pulled out from the loop-shaped engaging element 13a.

The upper end surface 42b of the hook portion 42 extends from the stem portion 41 along the fastener width direction and parallel to the upper surface of the substrate portion 21. This upper end surface 42b of the hook portion 42 is disposed at a position lower than the height position of the upper end surface 41d in the end portion of the hook portion 42 side in the stem portion 41 (inner side end portion) via a step regarding the upper and lower direction (height direction).

In this case, the step disposed between the upper end surface 41d of the stem portion 41 and the upper end surface 42b of the hook portion 42 has a reference surface (second reference surface) 47 which is parallel in the upper and lower direction and disposed at the same position as the one of the boundary 45 between an enlarged width portion 43 and a narrow width tip end portion 44 as explained later regarding the fastener width direction. It should be noted that the position of the boundary 45 in Embodiment 1 is the same as the compartment position comparting the stem portion 41 and the hook portion 42 in the fastener width direction. In this case, the second reference surface 47 can be reworded as the second boundary surface 47.

The front end surface 42c and the rear end surface 42c of the hook portion 42 are formed to be a symmetrical flat surface mutually with reference to the central position of the hook portion 42 in the fastener length direction. The front end surface 42c and the rear end surface 42c of the hook portion 42 is formed sloped to the fastener width direction so that the dimension of the hook portion 42 in the fastener length direction (element width dimension) gradually decreases toward the tip end portion (to be tapered).

In this case, the slope angle of the front end surface 42c and the rear end surface 42c of the hook portion 42 in the fastener width direction is set to be 5° or more and 20° or less, preferably 10° or more and 15° or less. By setting this slope angle at 5° or more (particularly 10° or more), the draft in which the molded surface fastener 1 in Embodiment 1 is demolded from the die wheel 51 can be formed stably. In addition, by setting the slope angle in the front and rear end surfaces 41c of the hook portion 42 at 20° or less (particularly 15° or less), it is prevented that the element width dimension at the tip end portion of the hook portion 42 becomes too small, and the strength of the hook portion 42 can be secured stably.

The engaging element 40 in Embodiment 1 has a boundary (dimension boundary part) 45 from which the element width dimension of the engaging element 40 (the dimension in the fastener length direction) is smaller in the extending direction of the hook portion 42. This boundary 45 from which the element width dimension changes is disposed along the fastener length direction (front and rear direction) and the height direction (upper and lower direction).

Further, the engaging element 40 in Embodiment 1 has an enlarged width portion 43 which is disposed from the boundary 45 on one side in the fastener width direction (outer side end edge portion side of the substrate portion 21) and secures the element width dimension wide, and a narrow width tip end portion 44 which is disposed from the boundary 45 on the other side in the fastener width direction (foldable piece portion 30 side) and extends from the enlarged width portion 43 in the fastener width direction while having a smaller element width dimension than the enlarged width portion 43.

Particularly in a case of Embodiment 1, the whole stem portion 41 is formed of the enlarged width portion 43 with wide element width dimension, the whole hook portion 42 is formed of the narrow width tip end portion 44, and the boundary 45 is disposed on the compartment position which comparts the stem portion 41 and the hook portion 42. In this case, the element width dimension of the narrow width tip end portion 44 on the boundary 45 is set to be smaller than the element width dimension of the enlarged width portion 43 on the boundary 45.

Further, the boundary 45 between the stem portion 41 (enlarged width portion 43) and the hook portion 42 (narrow width tip end portion 44) is set on the same position as the one of the upper end side of the inner side surface 41a of the stem portion 41 (i.e. the second inner side surface disposed parallel to the upper and lower direction in the inner side surface 41a).

It should be noted that, in Embodiment 1, when the boundary 45 is extended downward in the height direction in the cross-sectional view in FIG. 6, a part which is disposed between the extended line of the boundary 45 and the outer side surface 41b side of the stem portion 41 means a stem main body portion 48, and a part which is disposed between the extended line of the boundary 45 and the inner side surface 41a side of the stem portion 41 means a hem portion 49.

Figure 15:
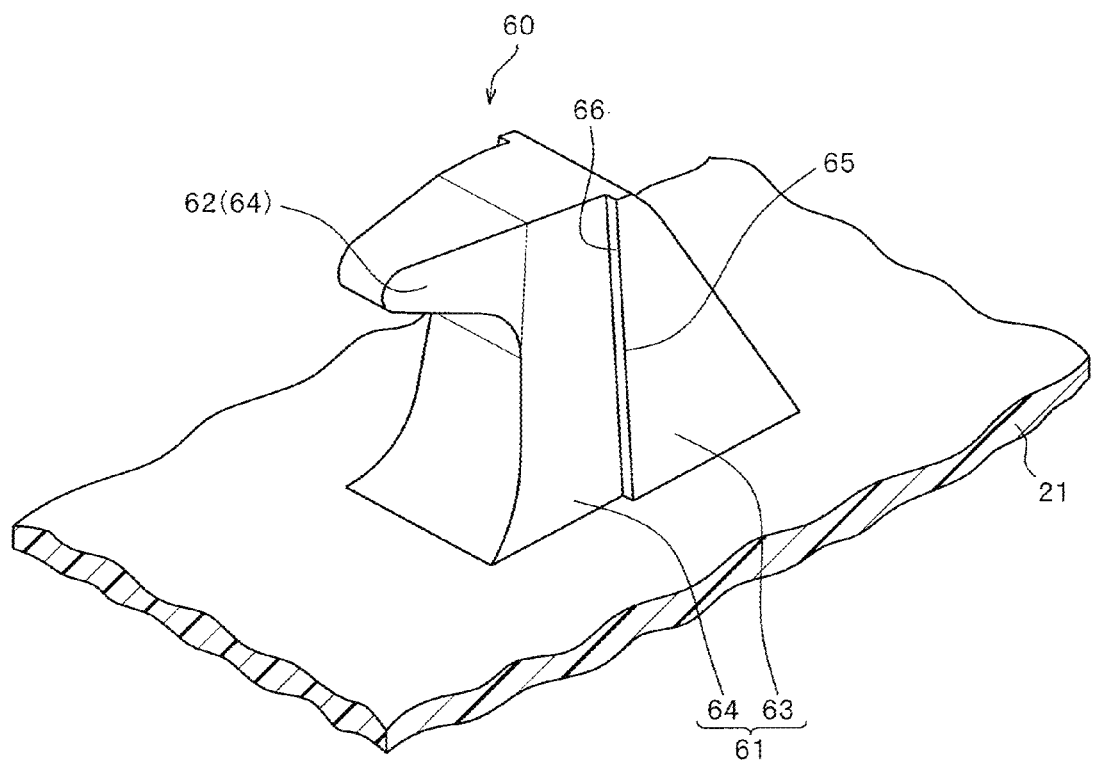
FIG. 15 is a perspective view illustrating the engaging element of the molded surface fastener according to a modification embodiment 1 in Embodiment 1 of the present invention.

In this invention, as explained later, it is possible that the position of the boundary 45 which is along with the upper and lower direction between the enlarged width portion 43 and the narrow width tip end portion 44 can be moved to the outer side surface 41b side of the stem portion 41 closer than in a case of Embodiment 1 (see the modification embodiment 1 of Embodiment 1 shown in FIGS. 15 and 16). In this case, the part between the boundary 45 and the outer side surface 41b side of the stem portion 41 (a part of the stem portion 41) is formed of the enlarged width portion 43, and the part between the boundary 45 and the inner side surface 41a side of the stem portion 41 (the remaining part of the stem portion 41) and the whole hook portion 42 are formed of the narrow width tip end portion 44.

In Embodiment 1, a reference surface (first reference surface) 46 parallel to the fastener length direction and the height direction is disposed on both left and right sides of the hook portion 42 at the boundary between the stem portion 41 and the hook portion 42. Here, the reference surface (first reference surface) 46 can be reworded as the boundary surface (first boundary surface) 46. The position at the center position of the element width dimension in the stem portion 41 and the position at the center position of the element width dimension in the hook portion 42 are disposed on the same straight line.

The element width dimension of the hook portion 42 is smaller than the element width dimension of the stem portion 41 via the first reference surface 46 of the boundary 45, and further the upper end surface 41d of the hook portion 42 is disposed on the height position lower than the upper end surface 41d of the stem portion 41 via the reference surface (second reference surface) 47 as explained above. Therefore, in a case where the molded surface fastener 1 in Embodiment 1 is molded by using the die wheel 51, the undercut which is perpendicular to the fastener width direction (machine intersect direction) is hard to be formed on the cavity surface molding the engaging element 40 (particularly, the cavity surface which is the boundary 45 between the stem portion 41 and the hook portion 42) even if the position misalignment or the dimension error of the cavity space, or the lamination misalignment to the circumferential direction of the plate occurs, as described later. Owing to this, it can be effectively prevented that several deficiencies caused by the undercut such as the cases that a part of the engaging element 40 is cut or torn off, or deformed, and the strength of the engaging element 40 is decreased by these incidents.

In addition, the whole stem portion 41 of the engaging element 40 is formed of the enlarged width portion 43, whereby the stiffness and the strength of the stem portion 41 can be increased. Owing to this, the stem portion 41 can hold the loop-shaped engaging element 13*a* of the female engaging member 13 serving as an engaging counterpart stably, and the deformation of or the damage to the stem portion 41 can hardly occur even if the stem portion 41 receives tension through the loop-shaped engaging element 13*a*, as explained later.

Further, the whole hook portion 42 of the engaging element 40 is formed of the narrow width tip end portion 44, whereby the hook portion 42 can be easily inserted to the loop-shaped engaging element 13*a* when the molded surface fastener 1 in Embodiment 1 engages with the female engaging member 13.

On the other hand, when the female engaging member 13 engaged with the molded surface fastener 1 in Embodiment 1 is moved to the fastener width direction and disengaged, the loop-shaped engaging element 13*a* of the female engaging member 13 hardly grapples the hook portion 42 of the engaging element 40 in Embodiment 1, and the loop-shaped engaging element 13*a* can be smoothly pulled out.

Owing to this, even if engagement and disengagement of the molded surface fastener 1 in Embodiment 1 and the female engaging member 13 are repeated, the damage which the engaging element 40 or the loop-shaped engaging element 13*a* of the female engaging member 13 in Embodiment 1 receives can be suppressed, and the durability of the molded surface fastener 1 and the female engaging member 13 can be increased.

The engaging element 40 in Embodiment 1 having such a form as above is disposed in a line at a predetermined attachment pitch or formation density within one engaging region 23 surrounded by a pair of front and rear lateral barrier portions 24 disposed along the fastener width direction on the upper surface of the substrate portion 21 and the outer side vertical barrier portion 25 and the inner side vertical barrier portion 26 disposed along the fastener length direction so as to obtain a proper engaging force in relation to the counterpart female engaging member 13.

Particularly in Embodiment 1, three rows of the engaging elements 40 (engaging element row) lining along the length direction between the outer side vertical barrier portion 25 and the inner side vertical barrier portion 26 are formed in the fastener width direction. In this case, the first line engaging element row disposed on the inner side vertical barrier portion 26 side and the third line engaging element row disposed on the outer side vertical barrier portion 25 side are formed corresponding to the positions of engaging elements 40 each other while the first and third line engaging element rows and the second line engaging element row disposed between the first and third lines are formed displacing positions of respective engaging elements 40 in the length direction. Therefore, in the engaging region 23 in Embodiment 1, the engaging elements 40 are disposed so as to be in a staggered position in relation to the adjacent engaging element rows.

The lateral barrier portion 24 in Embodiment 1 is disposed in the fastener length direction at a predetermined interval. And the engaging region 23 as described above is formed between a lateral barrier portion 24 and another lateral barrier portion 24 adjacent to the above lateral barrier portion 24 in the fastener length direction. Each lateral barrier portion 24 is formed of a single lateral wall body disposed continuously along the fastener width direction.

This lateral barrier portion 24 has a constant size of the height dimension from the substrate portion 21. The dimension in the fastener length direction between the front and rear surfaces of the lateral barrier portion 24 is also formed so as to have a constant size. In this case, the height dimension of the lateral barrier portion 24 is set to be the same size as the height dimension H of the engaging element 40. It should be noted that, as described above, the height dimension H of the engaging element 40 may be set to be smaller than the height dimension of the lateral barrier portion 24.

By having such a lateral barrier portion as above, the stiffness of the molded surface fastener 1 (particularly the stiffness of the substrate portion 21) can be effectively increased. In addition, when the molded surface fastener 1 is used by cutting with a predetermined length dimension, it can be prevented that the foam resin material penetrates from the fastener length direction into the engaging region 23 in foam molding of the cushion body 10 by the lateral barrier portions 24 disposed on the most front end side and the most rear end side of the cut molded surface fastener 1.

The outer side vertical barrier portion 25 of the first surface fastener portion 20*a* stands on the upper surface of the outer side end edge portion of the substrate portion 21. And the outer side vertical barrier portion 25 is disposed along the fastener length direction continuously between the lateral barrier portions 24 adjacent to each other in the fastener length direction. In this case, the outer side vertical barrier portion 25 is disposed on a position slightly inside (engaging region 23 side) of the outer end edge of the substrate portion 21.

In Embodiment 1, the outer side vertical barrier portion 25 is formed of two rows composed of the inner side barrier row 25*a* and the outer side barrier row 25*b* along the length direction lining in the fastener width direction. The inner side barrier row 25*a* is disposed between the engaging region 23 and the outer side barrier row 25*b*. This inner side barrier row 25*a* is formed of five vertical wall bodies disposed along the length direction at a predetermined attachment pitch intermittently.

The outer side barrier row 25*b* is formed of six vertical wall bodies disposed along the length direction at a predetermined attachment pitch intermittently. In this case, the vertical wall bodies of the inner side barrier row 25*a* and the vertical wall bodies of the outer side barrier row 25*b* are disposed so as to be staggered by staggering each other in the fastener length direction.

Further, each vertical wall body disposed on the inner side barrier row 25*a* and the outer side barrier row 25*b* of the outer side vertical barrier portion 25 are formed so as to have the same form and dimension each other. The height dimension of each vertical wall body is set to be the same size as the height dimension of the engaging element 40 and the lateral barrier portion 24.

The outer side vertical barrier portion 25 is formed of a plurality of vertical wall bodies as described above, whereby in foam molding of the cushion body 10, it can be prevented that the foam resin material penetrates into the engaging region 23 beyond the outer side vertical barrier portion 25 by making the upper surface of each vertical wall body of the outer side vertical barrier portion 25 attached to the fastener holding portion 15*a* of a molding die 15 described later. At the same time, it can be easy to let the air in the engaging region 23 to outside of the outer side vertical barrier portion 25.

The inner side vertical barrier portion 26 of the first surface fastener portion 20a is formed to be a symmetrical form to the outer side vertical barrier portion 25 of the first surface fastener portion 20a with reference to the center part of the fastener width direction in the engaging region 23. That is, the inner side vertical barrier portion 26 in Embodiment 1 is standing on the upper surface of the inner end edge part adjacent to the foldable piece portion 30 of the substrate portion 21 and disposed along the fastener length direction continuously between the lateral barrier portions 24 adjacent to each other in the fastener length direction. In this case, the inner side vertical barrier portion 26 is disposed on the position slightly closer to the inner side (engaging region 23 side) than the inner end edge of the substrate portion 21 connecting to the foldable piece portion 30.

The inner side vertical barrier portion 26 is formed of two rows composed of the inner side barrier rows 26a and the outer side barrier row 26b along the length direction lining in the fastener width direction. The inner side barrier row 26a is formed of five vertical wall bodies disposed along the length direction at a predetermined attachment pitch intermittently. The outer side barrier row 26b is formed of six vertical wall bodies disposed along the length direction at a predetermined attachment pitch intermittently.

In this case, the vertical wall bodies of the inner side barrier row 26a and the vertical wall bodies of the outer side barrier row 26b are disposed to be shifted in the fastener length direction so as to be alternately positioned. It should be noted that each vertical wall body forming this inner side vertical barrier portion 26 is formed substantially to be the same as each vertical wall body forming the outer side vertical barrier portion 25 described above. Therefore, in Embodiment 1, the upper end surfaces of the engaging element 40, the lateral barrier portion 24, the outer side vertical barrier portion 25 and the inner side vertical barrier portion 26 are disposed in such a position relationship as included in the same flat surface.

A foldable piece portion 30 connecting between the first and second surface fastener portions 20a, 20b in Embodiment 1 has the same length direction (dimension in the fastener length direction) as the one of the substrate portion 21 of the first and second surface fastener portions 20a, 20b. Also, this foldable piece portion 30 has a flat plate-shaped base portion 31 and a hinge portion 32 disposed on the end edge part of the first and second surface fastener portions 20a, 20b sides of the base portion 31.

The base portion 31 of the foldable piece portion 30 has the same thickness dimension (height dimension) as the one of the substrate portion 21 of the first and second surface fastener portions 20a, 20b so as to have a certain extent stiffness, and the base portion 31 itself is formed so as to be hard to fold. The dimension of the base portion 31 in the width direction is set to correspond appropriately to the dimension in the groove width direction of the groove portion for fixing a skin material 10a of the cushion body 10 to which the molded surface fastener 1 in Embodiment 1 is attached (See FIG. 14).

The hinge portion 32 of the foldable piece portion 30 is formed by disposing a concave-shaped groove portion on the upper surface of the foldable piece portion 30 along the fastener length direction. The hinge portion 32 is formed with the smaller thickness dimension than the one of the base portion 31, whereby the hinge portion 32 has higher flexibility than the base portion 31.

The foldable piece portion 30 is connected to the left and right first and second fastener surface portions 20a, 20b via the left and right hinge portions 32. Owing to this, the foldable piece portion 30 can be folded at the hinge portion 32 as a center with respect to the first surface fastener portion 20a and the second surface fastener portion 20b. In other words, it is possible that, from the cross-sectional view of the molded surface fastener 1 shown in FIG. 2, the first surface fastener portion 20a and the second surface fastener portion 20b can be easily folded so as to rotate upward or downward at the hinge portion 32 as a center with respect to the base portion 31 of the foldable piece portion 30.

In the molded surface fastener 1 in Embodiment 1 as described above, magnetic particle (magnetic material) composed of an alloy of iron, cobalt and nickel and the like is mixed in synthetic resin (or a composite of the synthetic resin and elastomer) forming the molded surface fastener 1. Particularly in Embodiment 1, the magnetic particles are mixed in the whole molded surface fastener 1 including the engaging element 40, the lateral barrier portion 24, the outer side vertical barrier portion 25 and the inner side vertical barrier portion 26 homogeneously.

It should be noted that the material of the mixed magnetic particles is not particularly limited as long as it is a material which can be magnetically attracted by magnet. Further, the magnetic material does not need to be a particle, and a metal plate, a metal coil or a metal piece composed of, for example, an alloy of iron, cobalt and nickel which has magnetic attraction may be fixed to a part of molded surface fastener member by adhering.

By mixing the magnetic particles in the molded surface fastener in Embodiment 1 as above, in a case where the fastener holding portion 15a of the molding die 15 is composed of a magnet as described later, the molded surface fastener 1 in Embodiment 1 can be stably attracted and fixed to the fastener holding portion 15a of the molding die 15 by utilizing a magnetic force emerging between the magnet of the fastener holding portion 15a and the magnetic particles mixed in the surface fastener member.

It should be noted that, though in Embodiment 1 a mixing region of the magnetic particles to be mixed to the molded surface fastener 1 is spread to the whole molded surface fastener 1 as described above, in the present invention the mixing region of the magnetic particles can be changed arbitrarily corresponding to the manufacturing method and the like of the molded surface fastener 1 as long as at least the magnetic particles are mixed in a part of the region of the outer side end edge portion opposite to the foldable piece portion 30 side in the first and second surface fastener portions 20a, 20b.

For example, the mixing region of the magnetic particles can be set only in the outer side end edge portions of the first and second surface fastener portions 20a, 20b and the base portion 31 of the foldable piece portion 30 across the whole length direction, or only in the region of the outer side end edge portions of the first and second surface fastener portions 20a, 20b across the whole length direction.

In this case, the objective for mixture is different between the magnetic particles disposed on the foldable piece portion 30 and the magnetic particles mixed in the first and second surface fastener portions 20a, 20b. That is, the magnetic particles mixed in the foldable piece portion 30 are utilized for position adjustment with respect to the fastener holding portion 15a of the molding die 15, as described later.

On the other hand, the magnetic particles disposed on the first and second surface fastener portions 20a, 20b are utilized so as to prevent the influx of the foam resin into the engaging element 40 region. Therefore, the magnetic particles mixed in the foldable piece portion 30 is preferably disposed as bilaterally symmetric with reference to the center part in the width direction of the foldable piece portion 30. Further, the magnetic particles mixed in the first and second surface fastener portions 20a, 20b are preferably disposed on respective barrier portions 24-26 or the substrate portion 21 just under the barrier portions 24-26.

Figure 7:
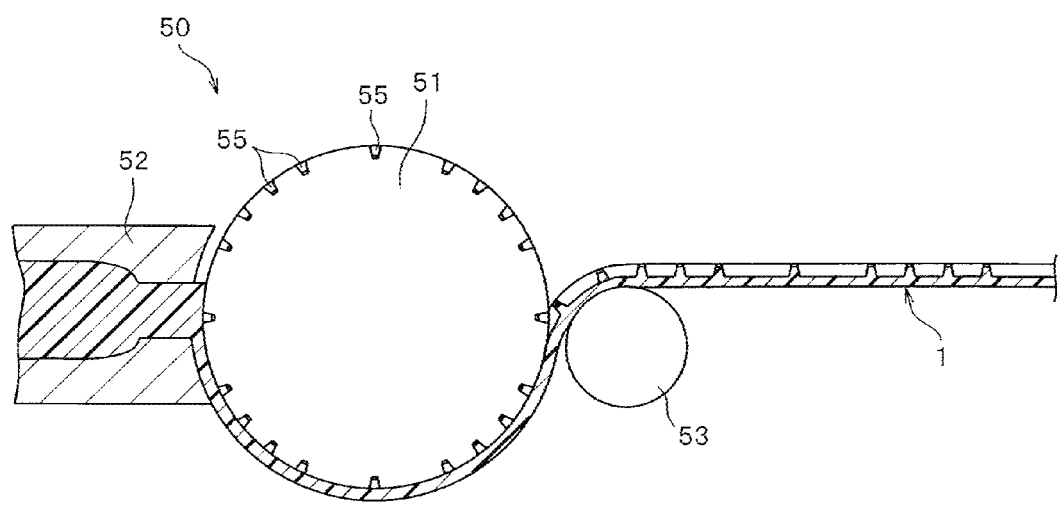
FIG. 7 is an explanatory view explaining a molding process of the molded surface fastener schematically.

The molded surface fastener 1 in Embodiment 1 having above structure is manufactured by using a manufacturing apparatus 50 as shown in FIG. 7, for example.

The manufacturing apparatus 50 of the molded surface fastener 1 shown in FIG. 7 has a die wheel 51 drivingly rotated in one direction, a continuous extrusion nozzle 52 for extruding the molten resin material disposed opposing to the circumferential surface of the die wheel 51, and a pickup roll 53 disposed to a downstream side of the continuous extrusion nozzle 52 in a rotation direction of the die wheel 51 and opposing to the circumferential surface of the die wheel 51.

A cavity space 55 for molding the engaging element 40, the lateral barrier portion 24, the outer side vertical barrier portion 25 and the inner side vertical barrier portion 26 of the molded surface fastener 1 is formed on the circumferential surface of the die wheel 51 which the manufacturing apparatus 50 has.

Figure 8:
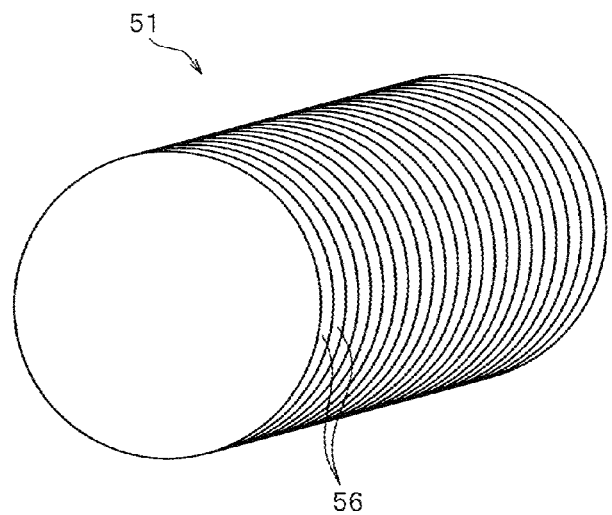
FIG. 8 is a schematic view explaining a form of a die wheel molding the molded surface fastener schematically.

The die wheel 51 is formed, as shown in FIG. 8, to be a columnar shape by laminating a plurality of discoidal plates 56 with a necessary thickness in the rotation axis direction of the die wheel 51. A predetermined cavity space 55 having a form of the engaging element 40 and the like is formed at the peripheral part of the discoidal plates 56 corresponding to the lamination position of each plate 56 by using the conventional and known technique such as electric discharge machining, laser processing or etching process.

Figure 9:
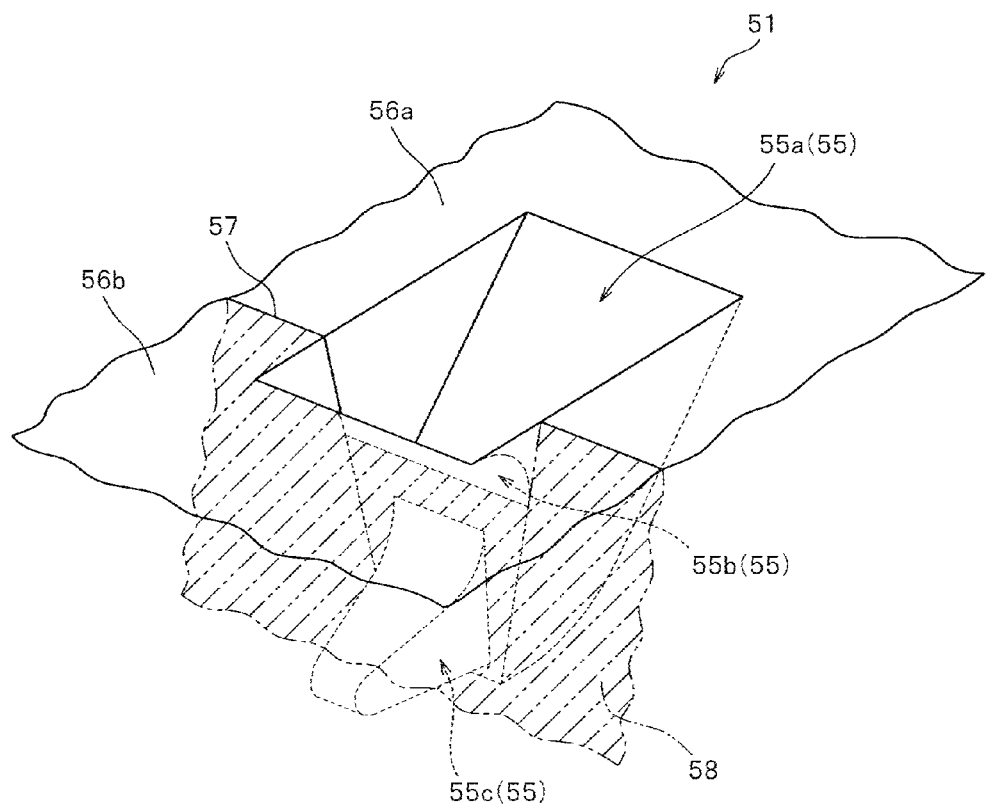
FIG. 9 is a schematic view illustrating a cavity space for the engaging element formed on a circumferential surface of the die wheel.
Figure 10:
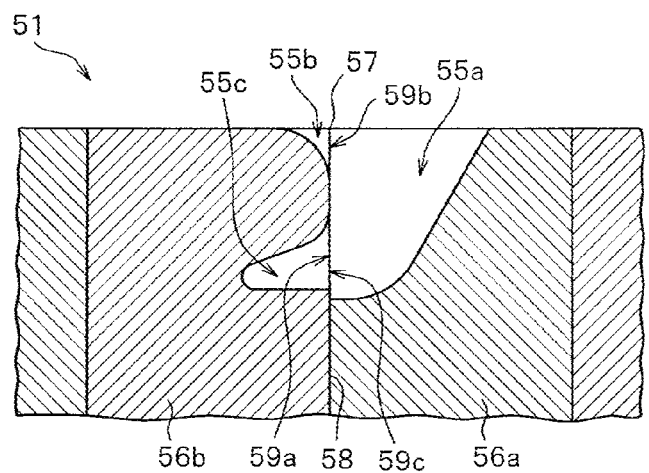
FIG. 10 is a cross-sectional view illustrating a cross-section perpendicular to a circumferential direction around the cavity space for the engaging element of the die wheel.

Particularly in the die wheel 51 in Example 1, as shown in FIGS. 9 and 10, two discoidal plates 56a, 56b laminated adjacent to each other are used for molding one engaging element 40 (row of engaging element 40).

In the die wheel 51, these two discoidal plates 56a, 56b are disposed on a position in the machine intersect direction corresponding to the position on which the row of the engaging elements 40 is disposed in the molded surface fastener 1. Further, a cavity space 55 molding the engaging element 40 and a cavity space 55 molding the lateral barrier portion 24 are disposed at a predetermined position on the peripheral part of these two discoidal plates 56a, 56b, as shown in FIG. 7 for example.

One of such two discoidal plates 56a, 56b molding the engaging element 40, the plate 56a (hereinafter, also referred to as "first plate 56a"), has a cavity space 55a molding a stem main body portion 48 disposed on the outer side surface 41b side of the stem portion 41 from the position of the boundary 45 in the fastener width direction of the engaging element 40 (machine intersect direction). This cavity space 55a is easily formed at the peripheral part of the first plate 56a by using the above-mentioned various processing methods.

The other of two discoidal plates 56a, 56b, the plate 56b (hereinafter, also referred to as "second plate 56b"), has a cavity space 55b molding a hem portion 49 disposed on the inner side surface 41a side of the stem portion 41 from the position of the boundary 45 in the fastener width direction of the engaging element 40 (machine intersect direction) and a cavity space 55c molding the whole hook portion 42. A parting line 57 between the first plate 56a and the second plate 56b is disposed along the boundary 45 of the engaging element 40.

In this case, in Embodiment 1, as shown in FIGS. 3 and 4, the hook portion 42 of the engaging element 40 (narrow width tip end portion 44) is formed to have a smaller element width dimension with respect to the stem portion 41 (enlarged width portion 43) via the first reference surface (first boundary surface) 46 formed on both left and right sides of the hook portion 42 at the boundary 45 while to have a lower height position of the upper end surface 41d via the second reference surface (second boundary surface) 47 formed on the upper side of the hook portion 42 along the boundary 45. That is, the hook portion 42 and the stem portion 41 are connected by a step including the first and second reference surfaces 46, 47.

Figure 11:
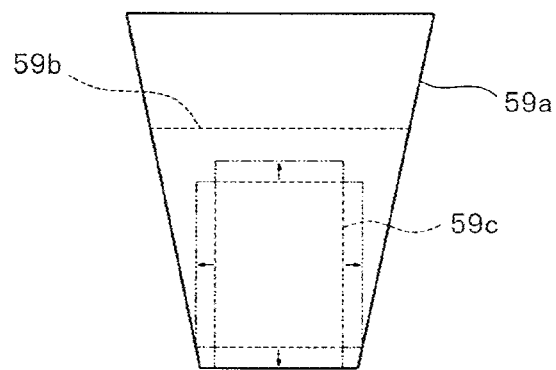
FIG. 11 is an explanatory view explaining a position relationship of the cavity space of a second plate with respect to the cavity space of a first plate.

Here, as the position relationship of the cavity spaces 55b, 55c of the second plate 56b with respect to the cavity space 55a of the first plate 56a in a case of laminating the first and second plates 56a, 56b is shown in FIG. 11, an opening 59c disposed on a parting surface 58 (surface including a parting line 57) of the cavity space 55c of the second plate 56b molding the hook portion 42 of the engaging element 40 is smaller than the opening 59a disposed on a parting surface 58 of the cavity space 55a of the first plate 56a as well as is disposed within an region inside of the opening 59a of the first plate 56a.

Accordingly, for example in the process of manufacturing the die wheel 51, and for example when the cavity spaces 55 are formed on the first and second plates 56a, 56b, respectively, the undercut is not formed between the first plate 56a and the second plate 56b even if the position of the opening 59c of the cavity space 55c molding the hook portion 42 of the second plate 56b is moved relatively with respect to the opening 59c of the cavity space 55a of the first plate 56a in the left and right direction (plate circumferential direction) or in the upper and lower direction (plate radius direction) for example within a range shown as imaginary lines in FIG. 11 due to the position misalignment or dimension error of the formed cavity space 55 or the misalignment of the relative position of the first and second plates 56a, 56b in the plate circumferential direction in laminating a plurality of discoidal plates 56.

Owing to this, in the molding process of the molded surface fastener 1, the engaging elements 40 molded within the cavity spaces 55a-55c of the first and second plates 56a, 56b can be smoothly pulled out by pulling them from the cavity spaces 55a-55c, and various kinds of deficiencies caused by a formation of the undercut such as the cases that, for example, the engaging element 40 can not be demolded from the cavity spaces 55a-55c, a part of the engaging element 40 is cut or torn off, the engaging element 40 is deformed, further the strength of the engaging element 40 is decreased by these incidents can be effectively prevented. Therefore, the engaging element 40 having a predetermined form can be stably molded, and as a result, the quality of the manufactured molded surface fastener 1 can be stabilized.

It should be noted that, in the engaging element 40 in Embodiment 1, such a reference surface 46 as is disposed on the boundary 45 between the stem portion 41 and the hook portion 42 is not disposed between the stem main body portion 48 of the stem portion 41 and the hem portion 49. Therefore, in such cases that, for example, the position misalignment or dimension error of the cavity spaces 55a, 55b of the first and second plates 56a, 56b occur, or the die wheel 51 was fabricated in a state that the relative position of the first and second plates 56a, 56b is misaligned in the plate circumferential direction, the position of the opening 59b of the cavity space 55b molding the hem portion 49 of the second plate 56b may be misaligned in the left and right direction (plate circumferential direction) or in the upper and lower direction (plate radius direction) with respect to the opening of the cavity space 55a of the first plate 56a.

Though, even if the position of the above-mentioned two openings 59a, 59b is misaligned relatively in the die wheel 51, the cavity space 55b molding the hem portion 49 of the second plate 56b is formed near the circumferential surface of the die wheel 51, whereby the molded engaging element 40 can be smoothly pulled out from the cavity spaces 55a-55c of the first and second plates 56a, 56b without grappling the molded engaging element 40 between the first plate 56a and the second plate 56b.

In a case of manufacturing the molded surface fastener 1 in Embodiment 1 by using the manufacturing apparatus 50 having above-mentioned die wheel 51 as in FIG. 7, the molten resin material is extruded continuously from the continuous extrusion nozzle 52 toward the circumferential surface of the die wheel 51 in the first place. At this time, the die wheel is rotating drivingly in one direction, and the substrate portion 21, the foldable piece portion 30 and the like in the molded surface fastener 1 are molded between the continuous extrusion nozzle 52 and the die wheel 51 by the molten resin material extruded to the circumferential surface of the die wheel. At the same time, the engaging element 40, the lateral barrier portion 24, the outer side vertical barrier portion 25, the inner side vertical barrier portion 26 and the like are molded in the cavity spaces 55 for molding formed on the circumferential surface portion of the die wheel 51.

The molded surface fastener 1 molded on the circumferential surface of the die wheel 51 is solidified by being held on the circumferential surface of the die wheel 51, cooled and rotated. After that, the solidified molded surface fastener 1 is continuously peeled off from the circumferential surface of the die wheel 51 by the pickup roll 53.

At this time, in the molded surface fastener 1 in Embodiment 1, since each engaging element 40 has the stem portion 41 with a large element width dimension and the hook portion 42 extending from the stem portion 41 with a smaller element width dimension via the boundary 45, the engaging element 40 having a predetermined form can be smoothly and stably pulled out from the cavity spaces 55 even if the position misalignment or the dimension error and the like in the cavity spaces 55 of the first and second plates 56a, 56b molding the engaging element 40 occur, as described above.

Next, the molded surface fastener 1 which is peeled off from the die wheel 51 and is long in the machine direction is carried toward the cutting part which is not shown in the Figure, cut with a predetermined length in the cutting part and collected, or rolled up to be a roll shape by the collecting roller while maintaining a state of the long molded surface fastener 1 and collected.

It should be noted that, in the present invention, the manufacturing apparatus or the manufacturing method of the molded surface fastener 1 is not limited in particular, and can be changed arbitrarily. For example in Embodiment 1, the molded surface fastener 1 is molded by extruding the molten resin material continuously from the continuous extrusion nozzle 52 toward the circumferential surface of one rolling die wheel 51.

However, in the present invention, the molded surface fastener 1 can be molded by setting a pair of upper and lower molding rollers in which at least one molding roller is formed by laminating a plurality of the discoidal plates and a predetermined cavity space is formed on the circumferential surface of the molding roller, and by extruding the molten resin material continuously from the continuous extrusion nozzle between the pair of upper and lower molding rollers.

The molded surface fastener 1 in Embodiment 1 manufactured as above is integrated to the groove portion for fixing a skin material 10a of the cushion body 10 as described later by molding (two-colored molding) at the same time, for example, the cushion body (foam body) 10 of such as a seat for automobile and the like is foam molded (see FIG. 14).

Specifically, the molded surface fastener 1 having a predetermined length in Embodiment 1 is prepared and the molding die 15 for foam molding of the cushion body 10 is provided. At this time, the provided molding die 15 has a cavity space corresponding to the form of the cushion body 10 to be molded.

Figure 14:
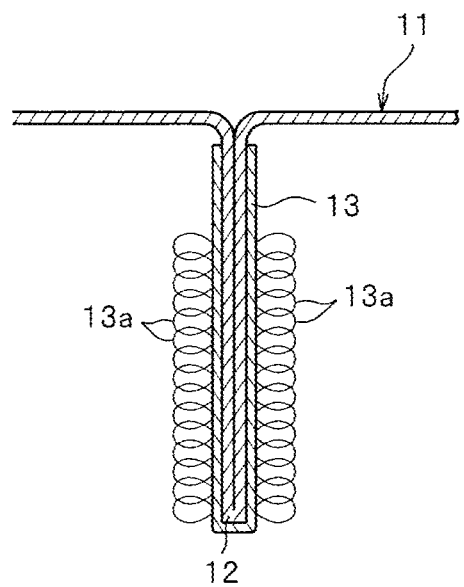
FIG. 14 is a cross-sectional view illustrating a cushion body to which the molded surface fastener is integrated and a skin material attached to the cushion body.
Figure 14:
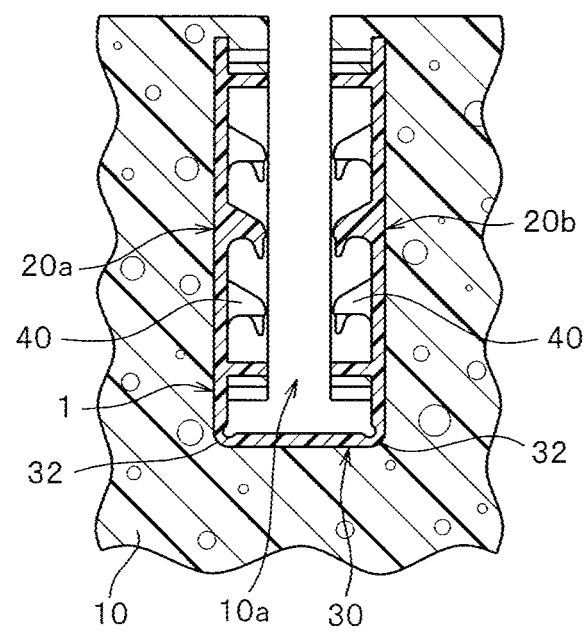

In the cushion body 10 to be molded, as shown in FIG. 14 for example, a groove portion for fixing a skin material 10a in which the engaged insertion piece portion 12 of the skin material 11 as described later can be inserted is formed, and the molded surface fastener 1 is fixed in a side wall portion and a groove bottom portion of the groove portion for fixing a skin material 10a.

Figure 12:
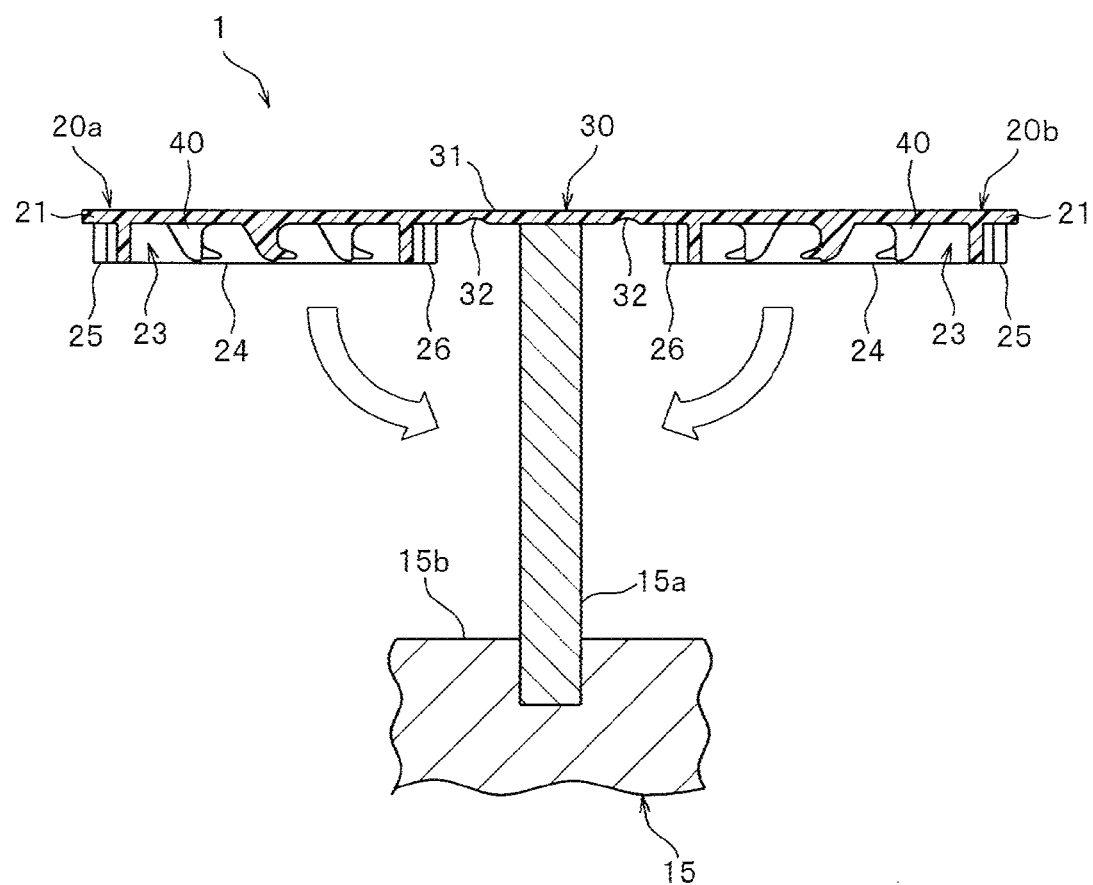
FIG. 12 is an explanatory view explaining an attachment operation of the molded surface fastener to a fastener holding portion of a molding die.

In this case, for example as shown in FIG. 12, in the molding die 15, the fastener holding portion 15a is protruded from the cavity surface (inner wall surface) 15b of the molding die 15 forming a surface (outer surface) of the cushion body 10 into the cavity space to form the groove portion for fixing a skin material 10a of the cushion body 10 and hold the molded surface fastener 1 in foam molding of the cushion body 10.

This fastener holding portion 15a of the molding die 15 is composed of a magnet such as a neodymium magnet and the like. Also, the fastener holding portion 15a is formed long in the groove length direction conforming to the form of the groove portion for fixing a skin material 10a. Furthermore, the fastener holding portion 15a has a flat top end surface (tip end surface) and left and right flat side wall surfaces which are bent from the left and right side edges of the top end part and perpendicular to the top end surface so that the cross-sectional surface of a part protruding from the cavity surface has a rectangular shape.

The top end surface of such a fastener holding portion 15a becomes a first holding portion holding the foldable piece portion 30 of the molded surface fastener 1 in attaching the molded surface fastener 1 to the fastener holding portion 15a, and the left and right side wall surfaces of the fastener holding portion 15a become second holding portions holding the first and second surface fastener portions 20a, 20b of the molded surface fastener 1. These first and second holding portions have an attracting surface capable of attracting by the magnetic force respectively, and the top end surface (attracting surface) of the first holding portion and the side wall surface (attracting surface) of the second holding portion are formed to be a flat surface.

Since the fastener holding portion 15a has a simple form not having a concave portion on its surface as above, the increase in the manufacturing cost of the molding die 15 can be suppressed. In addition, it can be prevented that the cleansing work of the molding die 15 after foam molding the cushion body 10 is cumbersome and the time for cleansing work may be shortened. As a result, the manufacturing process of the cushion body 10 can be streamlined and the manufacturing cost may be reduced.

In a case where the molded surface fastener 1 is attached to such a fastener holding portion 15a of the molding die 15 as above, the molded surface fastener 1 in Embodiment 1 is moved to be close to the fastener holding portion 15a in a state that the first and second surface fastener portions 20a, 20b are open sideways (in other words, in a state that the first and second surface fastener portions 20a, 20b are not folded with respect to the foldable piece portion 30 or slightly folded), and the base portion 31 of the foldable piece portion 30 of the molded surface fastener 1 is placed upon the top end surface of the fastener holding portion 15a in the first place. Thereby the magnetic particles mixed in the molded surface fastener 1 are attracted to the magnet of the fastener holding portion 15a and the base portion 31 of the foldable piece portion 30 is attracted and fixed to the top end surface as the first holding portion of the fastener holding portion 15a.

At this time, a self-alignment effect able to align a position of the foldable piece portion 30 of the molded surface fastener 1 at a predetermined position along the fastener holding portion 15a can be obtained by utilizing the magnetic force emerging between the magnetic particles mixed in the base portion 31 of the foldable piece portion 30 and the magnet of the fastener holding portion 15a.

Figure 13:
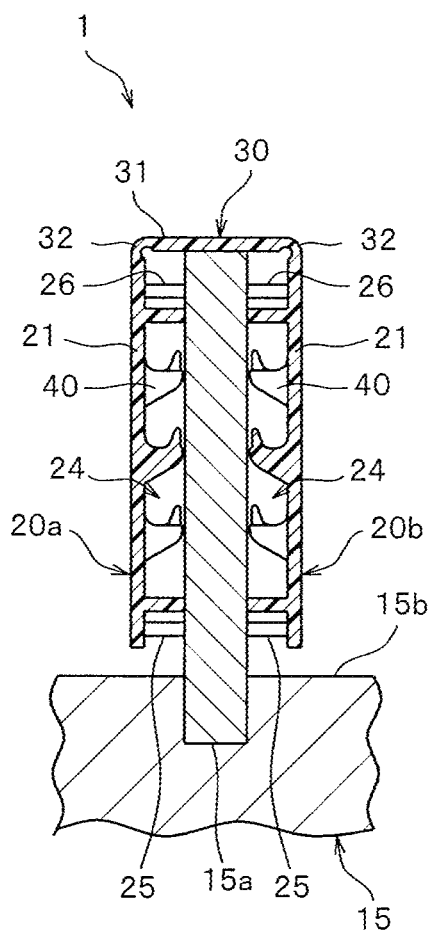
FIG. 13 is a schematic view illustrating a state that the molded surface fastener is held at the fastener holding portion of the molding die.

At the same time or after the foldable piece portion 30 is fixed on the top end surface of the fastener holding portion 15a, the first and second surface fastener portions 20a, 20b of the molded surface fastener 1 which were opened sideways are folded automatically so as to be close to the fastener holding portion 15a at the hinge portion 32 of the foldable piece portion as a center with respect to the base portion 31 of the foldable piece portion 30 by the mixed magnetic particles being attracted by the magnet of the fastener holding portion 15a, and attracted and fixed to the left and right side wall surfaces of the fastener holding portion 15a as shown in FIG. 13.

At this time, in the molded surface fastener 1, the upper surface of the base portion 31 of the foldable piece portion 30 is adhered to the top end surface of the fastener holding portion 15a, and each upper surface of the engagement element 40, the lateral barrier portion 24, the outer side vertical barrier portion 25 and the inner side vertical barrier portion 26 in the first and second surface fastener portions 20a, 20b is held by the fastener holding portion 15a in a state of adhering to the side wall surfaces of the fastener holding portion 15a.

As above, in Embodiment 1, the attaching operation of the molded surface fastener 1 to the molding die 15 can be efficiently, and the work load of molding the cushion body 10 and the cost thereof can be reduced. In addition, it can be prevented that a gap which the foam resin material can penetrate through is formed between each upper surface of the lateral barrier portion 24, the outer side vertical barrier portion 25 and the inner side vertical barrier portion 26 of the first and second surface fastener portions 20a, 20b and the left and right side wall surfaces of the fastener holding portion 15a, as well as each engaging region 23 formed in the first and second surface fastener portions 20a, 20b can be blocked by the side wall surfaces of the fastener holding portion 15a and each barrier portion 24-26.

Then, the foam resin material is injected and infused from the injection nozzle which is not shown in the Figure into the molding die 15 in a state the molded surface fastener 1 in Embodiment 1 is held at the fastener holding portion 15a as above. At this time, the foam resin material can be infused throughout the cavity space 55 of the molding die 15, for example by injecting the foam resin material while moving the injection nozzle relative to the molding die 15. Further, after a predetermined amount of the foam resin material is injected from the injection nozzle, the molding die 15 is mold clamped. Thereby the foam resin material spreads throughout the whole cavity space 55 of the molding die 15 while foaming, and the cushion body 10 is molded.

At this time, since the molded surface fastener 1 is fixed at a predetermined position by attracting effect of the magnet composing the fastener holding portion 15a, the position of the molded surface fastener 1 can not be moved by the flux pressure or the expanding pressure of the foam resin material. In addition, since the upper surface of each barrier portion 24-26 of the first and second surface fastener portions 20a, 20b is adhered to the side wall surface of the fastener holding portion 15a, it can be prevented that the foam resin material flowing within the cavity space 55 penetrates into the engaging region 23 beyond the lateral barrier portion 24, the outer side vertical barrier portion 25 and the inner side vertical barrier portion 26 of the first and second surface fastener portion 20a, 20b.

After that, the foam resin material is expanded and solidified within the cavity space 55 of the molding die 15 and the molding is finished, whereby the cushion body 10 to which the molded surface fastener 1 in Embodiment 1 is integrated can be obtained, as shown in FIG. 14. It should be noted that, in this FIG. 14, the cushion body 10 which can be obtained from the state in FIG. 13 is shown as reversed in the upper and lower aspects.

In the cushion body 10 manufactured in such a way, the groove portion for fixing a skin material 10a in which the engaged insertion piece portion 12 disposed on the skin material 11 can be inserted is formed of the fastener holding portion 15a of the molding die 15 at a predetermined position of the surface portion of the cushion body 10. The molded surface fastener 1 is fixed and integrated to this groove portion for fixing a skin material 10a of the cushion body 10.

In this case, the foldable piece portion 30 of the molded surface fastener 1 is disposed on the groove bottom portion of the groove portion for fixing a skin material 10a, and the first and second surface fastener portions 20a, 20b are disposed opposing to each other on opposed left and right side wall portions of the groove portion for fixing a skin material 10a in a state that each engaging region 23 is exposed.

Particularly, in the molded surface fastener 1 in Embodiment 1, since the penetration of the foam resin into the engaging region 23 of the first and second surface fastener portions 20a, 20b is prevented by each barrier portion 24-26 as described above, the foam resin is not penetrated into the engaging region 23 and a plurality of engaging elements 40 disposed on the upper surface of the first and second surface fastener portions 20a, 20b can be fully exposed. Owing to this, in the engaging region 23 of the first and second surface fastener portions 20a, 20b, a desired engaging force by a plurality of engaging elements 40 can be stably secured.

On the other hand, the skin material 11 covering the surface of the cushion body 10 in such an Embodiment 1 has an engaged insertion piece portion 12 which can be inserted into the groove portion for fixing a skin material 10a of the cushion body 10. A female engaging member 13 having a plurality of loop-shaped engaging elements 13a is attached by sewing and the like to this engaged insertion piece portion 12.

In this case, the loop-shaped engaging elements 13a of the female engaging member 13 attached to the engaged insertion piece portion 12 are provided separately in the regions of the left and right side surface portions of the engaged insertion piece portion 12 so as to correspond to a position of the engaging region 23 of the molded surface fastener 1 disposed at the groove portion for fixing a skin material 10a of the cushion body 10. A disengaging region which does not have the loop-shaped engaging element 13a is also formed at the tip end portion of the engaged insertion piece portion 12. It should be noted that, in the present invention, the female engaging member 13 does not necessarily have such a disengaging region as above but may have the loop-shaped engaging elements 13a on the whole of one surface (whole surface) of the female engaging member 13.

In Embodiment 1, the skin material 11 having such an engaged insertion piece portion 12 covers over the foam molded cushion body 10. At the same time, the engaged insertion piece portion 12 of the skin material 11 is pushed and inserted into the groove portion for fixing a skin material 10a of the cushion body 10.

At this time, in each hook-shaped engaging element 40 of the molded surface fastener 1 disposed on the groove portion for fixing a skin material 10a of the cushion body 10, its hook portion 42 is extended from the stem portion 41 toward one direction of a groove bottom portion side of the groove portion for fixing a skin material 10a. Owing to this, the engaged insertion piece portion 12 of the skin material 11 can be inserted easily and smoothly to a predetermined depth of the groove portion for fixing a skin material 10a without grappling each loop-shaped engaging element 13a of the engaged insertion piece portion 12 with the hook-shaped engaging element 40 of the molded surface fastener 1.

Then, the engaged insertion piece portion 12 is pulled by the tension of the skin material 11 after the engaged insertion piece portion 12 of the skin material 11 is inserted into a predetermined depth of the groove portion for fixing a skin material 10a, whereby respective loop-shaped engaging elements 13a of the engaged insertion piece portion 12 are engaged with a plurality of hook-shaped engaging elements 40 disposed on the first and second surface fastener portions 20a, 20b of the molded surface fastener 1, and the engaged insertion piece portion 12 can be fixed to the molded surface fastener 1 within the groove portion for fixing a skin material 10a.

In this case, in the molded surface fastener 1 in Embodiment 1, since the hook portion 42 of each engaging element 40 extends from the stem portion 41 toward the groove bottom portion side of the groove portion for fixing a skin material 10a, and the element width dimension of the hook portion 42 (narrow width tip end portion 44) is smaller than the stem portion 41 (enlarged width portion 43), the hook portion 42 of the hook-shaped engaging element 40 can be easily inserted into the loop-shaped engaging element 13a.

Further, the engaged insertion piece portion 12 is pulled by the tension as above after the hook portion 42 of the engaging element 40 is inserted into the loop-shaped engaging element 13a, whereby the loop-shaped engaging element 13a moves to the stem portion 41 of the engaging element 40 and is held by the stem portion 41.

At this time, since the stem portion 41 of the engaging element 40 is formed of the enlarged width portion 43 in which the element width dimension is large, and its stiffness and strength are increased, the loop-shaped engaging element 13a can be held securely so that the engaged insertion piece portion 12 does not exit, and the engaged insertion piece portion 12 can be fixed strongly to the side wall portions of the groove portion for fixing a skin material 10a.

Owing to this, since the skin material 11 can be fastened certainly at a predetermined position of the cushion body 10, it is possible to prevent that the skin material 11 is floated from the cushion body 10, or the position of the skin material 11 with respect to the cushion body 10 misaligns, then the skin material 11 can be attached along the surface of the cushion body 10 properly, and the attaching state of the skin material 11 can be maintained stably. As a result, the appearance of a product in which the skin material 11 is attached to the cushion body 10 can be better and the quality of the product appearance can be improved.

It should be noted that, in the molded surface fastener 1 regarding Embodiment 1, the position of the boundary 45 which is formed along the upper and lower direction at the reference surface (boundary surface) 46 and comparts the enlarged width portion 43 and the narrow width tip end portion 44 is set to be between the stem portion 41 and the hook portion 42 as shown in FIG. 6 and the like.

However, in the present invention, the position of the boundary 45 which comparts the enlarged width portion 43 and the narrow width tip end portion 44 is not limited to the above case. For example, as the engaging element regarding the modification embodiment 1 of Embodiment 1 is shown in FIGS. 15 and 16, the engaging element 60 can be formed so that the position of the boundary 65 is staggered to the outer side surface side of the stem portion 61 (the opposite direction to the extending direction from the stem portion 61 of the hook portion 62) closer than in a case of the engaging element 40 in Embodiment 1 described above.

It should be noted that, in each of the modification embodiment of Embodiment 1 explained as follows, the explanation of parts or members composed to be substantially the same as in the molded surface fastener 1 regarding the above Embodiment 1 is not described but represented with the same reference signs.

This engaging element 60 regarding the modification embodiment 1 has a stem portion 61 standing on an upper surface of the substrate portion 21 and a hook portion 62 extending from a side surface of the stem portion 61 along a fastener width direction. In addition, this engaging element 60 has an enlarged width portion 63 in which the element width dimension is secured large and a narrow width tip end portion 64 which extends from the enlarged width portion 63 in the fastener width direction and has a smaller element width dimension than the enlarged width portion 63. A boundary 65 at which the element width dimension changes is disposed between the enlarged width portion 63 and the narrow width tip end portion 64 along an upper and lower direction.

In this case, the boundary 65 is set on the stem portion 61. That is, the stem portion 61 in the modification embodiment 1 has the enlarged width portion 63 in which the element wide dimension is large and the narrow width tip end portion 64 in which the element width dimension is small, and a reference surface (first reference surface) 66 which is disposed parallel to the fastener length direction and the element width dimension changes at the boundary 65. The hook portion 62 is formed of only the narrow width tip end portion 64 in which the element width dimension is small. Further, an upper end surface of the stem portion 61 and the upper end surface of the hook portion 62 are disposed on continuous single flat surface.

As above, in even the engaging element 60 in which the boundary 65 between the enlarged width portion 63 and the narrow width tip end portion 64 is set on the stem portion 61, in a case of molding the molded surface fastener 1 using the die wheel 51, the undercut is hard to be formed on a cavity space molding the engaging element 60 even if the position misalignment or dimension error of the cavity space, or the lamination misalignment in the circumferential direction of the discoidal plate occurs. Owing to this, also in this modification embodiment 1, as in a case of above Embodiment 1, various kinds of deficiencies caused by the undercut can be effectively prevented.

Figure 16:
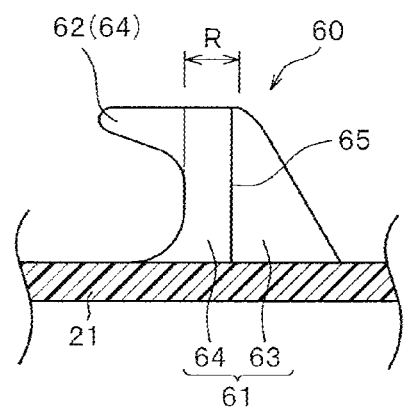
FIG. 16 is a schematic view viewing the engaging element from the fastener length direction side.

It should be noted that, in the present invention, regarding the fastener width direction (machine intersect direction), the position of the boundary 65 which comparts the enlarged width portion 63 and the narrow width tip end portion 64 may be set arbitrarily within a region R from a boundary position between the stem portion 61 and the hook portion 62 (in other words, a position of the upper end part of an inner side surface of the stem portion 61) to an end edge position of the opposite direction to the extending direction of the hook portion 62 in the upper end surface (top end surface) of the stem portion 61 (in other words, a ridge line position between the upper end surface and an outer side surface of the stem portion 61), as shown in FIG. 16. In this case, the Region R is a range in which the upper end surface of the stem portion 61 is formed.

Figure 17:
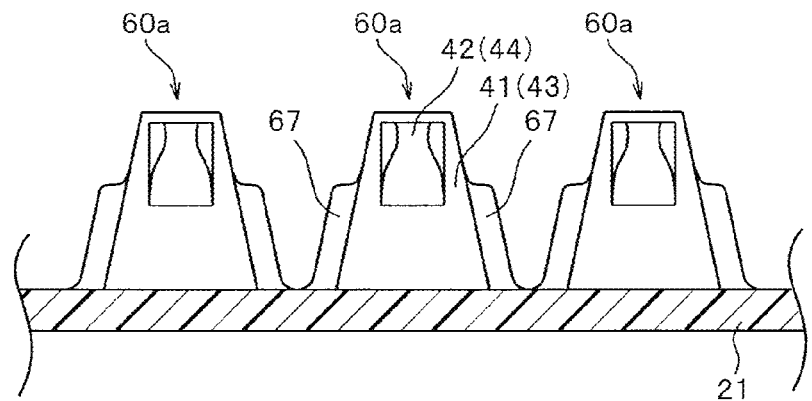
FIG. 17 is a figure viewing the engaging element of the molded surface fastener according to a modification embodiment 2 in Embodiment 1 of the present invention.
Figure 18:
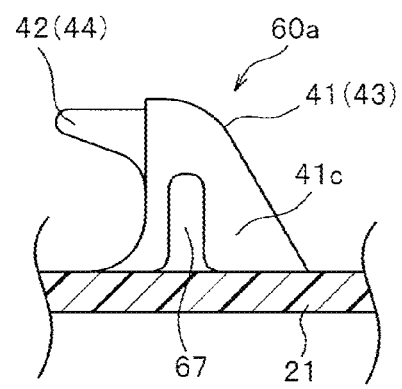
FIG. 18 is a schematic view viewing the engaging element from the fastener length direction side.

Further in the present invention, as the engaging element regarding the modification embodiment 2 of Embodiment 1 is shown in FIGS. 17 and 18, the molded surface fastener can be formed by providing reinforcement ribs 67 which reinforces the engaging element 60a integrally from the front and rear end surfaces 41c of the stem portion 41 to the upper surface of the substrate portion 21 on both left and right sides of the stem portion 41 of the engaging element 60a.

In this case, the engaging element 60a regarding the modification embodiment 2 is formed to be the same as the engaging element 40 in the above Embodiment 1 except that the left and right reinforcement ribs 67 are formed. The left and right reinforcement ribs 67 are provided as above, whereby the strength of the engaging element 60a (particularly stem portion 41) can be effectively increased.

Figure 19:
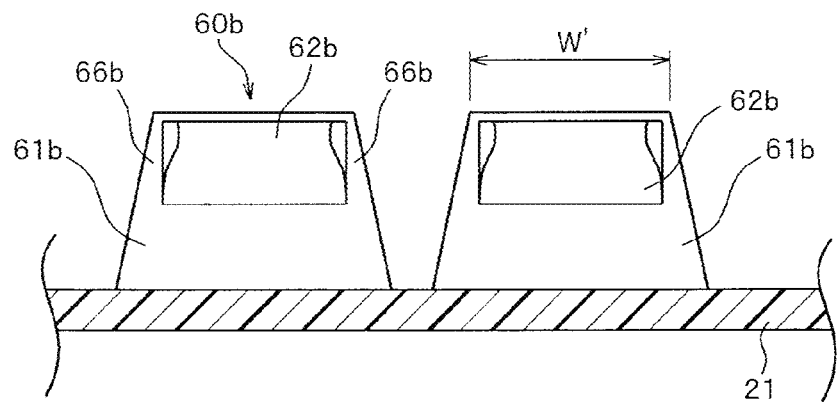
FIG. 19 is a figure viewing the engaging element of the molded surface fastener according to a modification embodiment 3 in Embodiment 1 of the present invention from the hook portion side.

Further in the present invention, as the engaging element regarding the modification embodiment 3 of Embodiment 1 is shown in FIG. 19 for example, it is possible that the molded surface fastener is formed by making the element width dimensions of the stem portion 61b and the hook portion 62b of the engaging element 60b larger than the ones of the stem portion 41 and the hook portion 42 of the engaging element 40 in the above Embodiment 1. In this case, the engaging element 60b regarding the modification embodiment 3 is formed to be the same as the engaging element 40 in the above Embodiment 1 except that the engaging width dimensions of the stem portion 61b and the hook portion 62b are large.

For example, an element width dimension W of the upper end part of the stem portion 41 in the above Embodiment 1 is set to be 0.1 mm or more and 3.0 mm or less. On the other hand, an element width dimension W' of the upper end part of the stem portion 61b in the modification embodiment 3 is set to be 1.5 mm or more and 15.0 mm or less, preferably 3.0 mm or more and 10.0 mm or less. Further, in the modification embodiment 3, the hook portion 62b extends from the stem portion 61b with a smaller element width dimension than the stem portion 61b via the reference surface 66b of the boundary.

Even the molded surface fastener having such an engaging element 60b regarding the modification embodiment 3 can obtain the same effect as in the molded surface fastener 1 of the above Embodiment 1.

Figure 20:
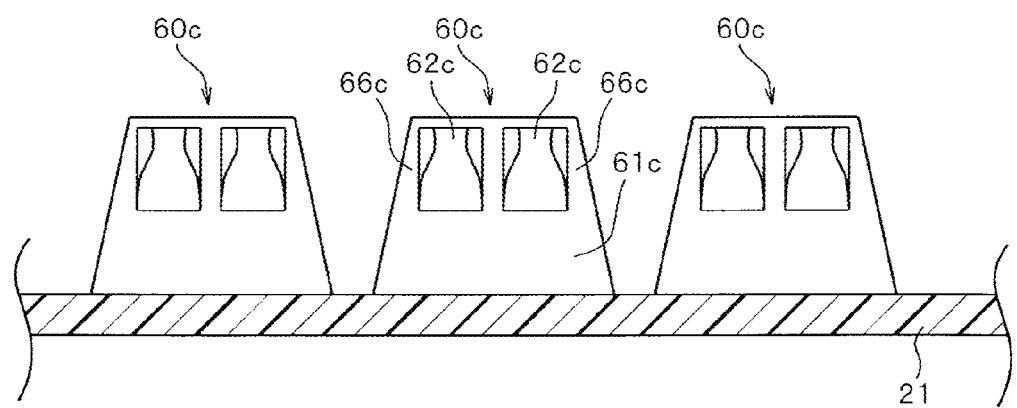
FIG. 20 is a figure viewing the engaging element of the molded surface fastener according to a modification embodiment 4 in Embodiment 1 of the present invention from the hook portion side.

Further in the present invention, as the engaging element regarding the modification embodiment 4 of Embodiment 1 is shown in FIG. 20 for example, it is possible that the stem portion 61c of the engaging element 60c is formed to have a larger element width dimension than in the case of the above Embodiment 1, and two or more hook portions 62c having a smaller element width dimension than the stem portion 61c extend from one stem portion 61c in the fastener width direction via the reference surface (boundary surface) 66c of the boundary. In this case, the hook portion 62c of the modification embodiment 4 has the same form and dimension as the ones of the hook portion 42 in the above Embodiment 1.

In the molded surface fastener having such an engaging element 60c in the modification embodiment 4, two or more loop-shaped engaging elements 13a in the female engaging member 13 can be engaged serially with one engaging element 60c. Therefore, the molded surface fastener regarding the modification embodiment 4 is preferably used to such a product that a strong cutting force is added between the molded surface fastener and the female engaging member 13 in a state that the female engaging member 13 is engaged.

Figure 21:
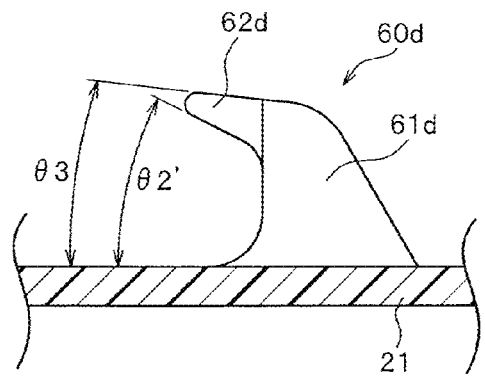
FIG. 21 is a figure viewing the engaging element of the molded surface fastener according to a modification embodiment 5 in Embodiment 1 of the present invention from the fastener length direction side.

In addition, in the present invention, as the engaging element regarding the modification embodiment 5 of Embodiment 1 is shown in FIG. 21, the engaging element 60d can be formed of the hook portion 62d extending from the stem portion 61d to a slightly upward direction with respect to the fastener width direction so that an angle θ2' which a lower end surface of the hook portion 62d forms with respect to the upper surface of the substrate portion 21 is larger than the angle θ2 in the engaging element 40 of the above Embodiment 1.

In this case, an angle θ3 which the upper end surface of the hook portion 62d forms with respect to the upper surface of the substrate portion 21 is set to be smaller than the angle θ2' which the lower end surface of the hook portion 62d forms with respect to the upper surface of the substrate portion 21. Particularly in the modification embodiment 5, this angle θ3 is set to be 0° or more and 25° or less. Further, the upper end surface of the hook portion 62d is formed on the surface which is continuous to the upper end surface or the outer side surface of the stem portion 61.

In the molded surface fastener having such an engaging element 60d in the modification embodiment 5, the angle θ2' formed by the lower end surface of the hook portion 62d and the upper surface of the substrate portion 21 can be secured larger than in a case of the engaging element 40 in the above Embodiment 1. Owing to this, when the female engaging member 13 is engaged with the molded surface fastener in the modification embodiment 5, or the female engaging member 13 engaged with the molded surface fastener in the modification embodiment 5 is disengaged, the loop-shaped engaging element 13a of the female engaging member 13 becomes harder to grapple the engaging element 60d.

Accordingly, even if the engagement and the disengagement of the molded surface fastener in the modification embodiment 5 with the female engaging member 13 is repeated, the damage which the hook-shaped engaging element 60d or the loop-shaped engaging element 13a of the female engaging member 13 receives can be smaller, and the durability of the molded surface fastener and the female engaging member 13 can be further increased.

Figure 22:
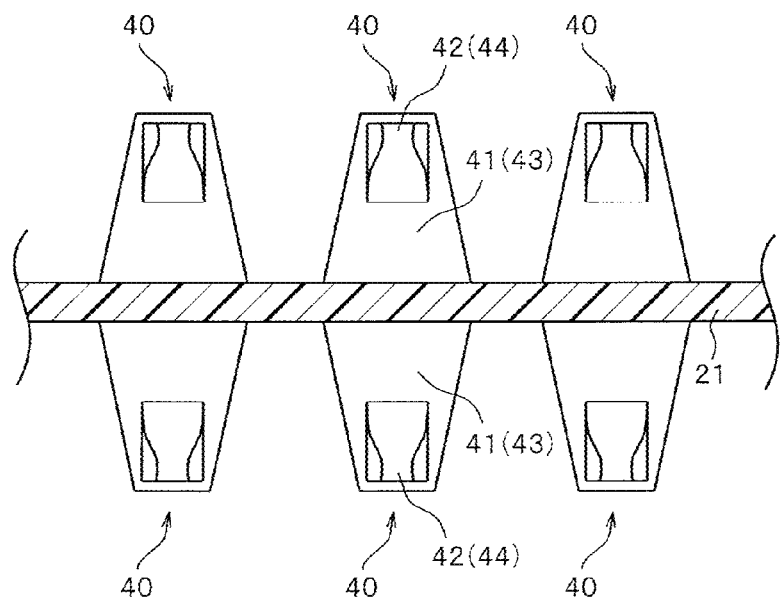
FIG. 22 is a main part enlarged view illustrating the enlarged main part of the molded surface fastener according to a modification embodiment 6 in Embodiment 1 of the present invention.
Figure 23:
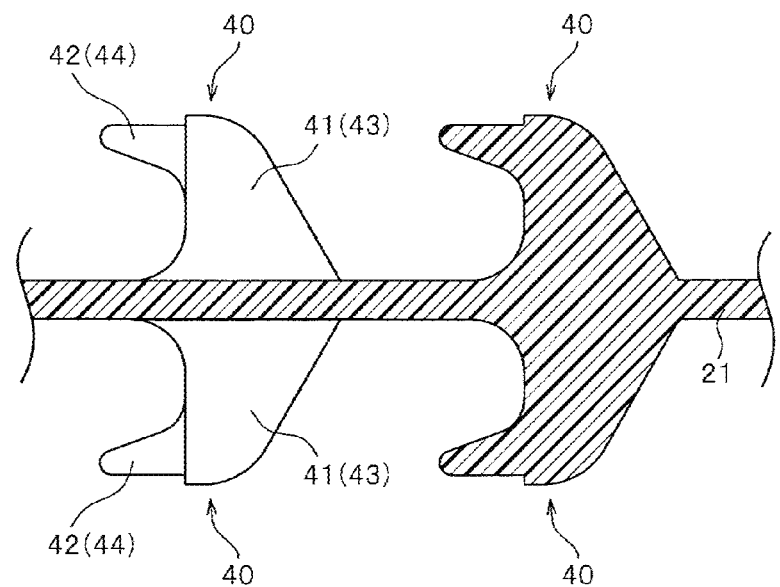
FIG. 23 is a main part cross-sectional view illustrating the main part of the molded surface fastener according to the modification embodiment 6 as a cross-section perpendicular to the fastener length direction.
Figure 24:
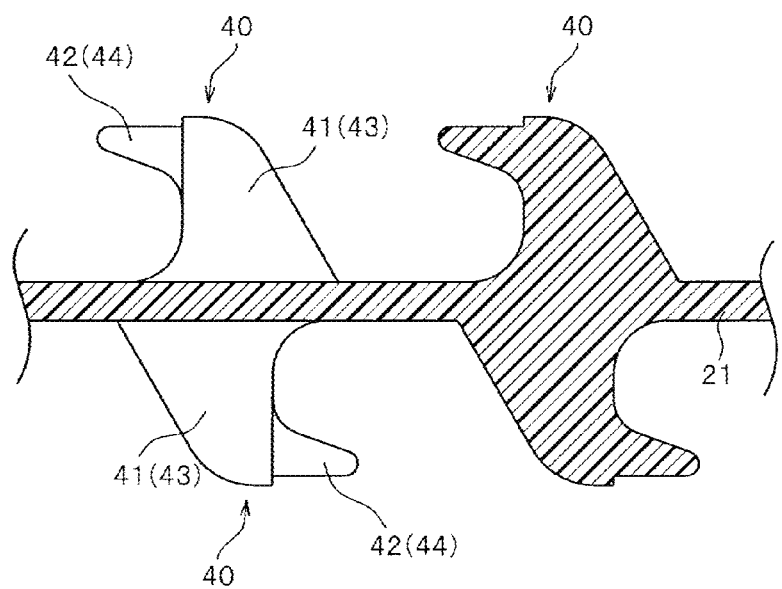
FIG. 24 is a main part cross-sectional view illustrating the main part of the molded surface fastener according to a modification embodiment 7 in Embodiment 1 of the present invention as a cross-section perpendicular to the fastener length direction.

Further, in the present invention, as the molded surface fastener regarding the modification embodiment 6 of Embodiment 1 is shown in FIGS. 22 and 23, and as the molded surface fastener regarding the modification embodiment 7 of Embodiment 1 is shown in FIG. 24 for example, the engaging element 40 can be provided on both upper and lower surfaces of the substrate portion 21.

In this case, in the engaging element 40 provided on the lower surface side of the substrate portion 21, the extending direction of the hook portion 42 with respect to the stem portion 41 may be directed to the same direction as the engaging element 40 provided on the upper surface side of the substrate portion 21 as in the modification embodiment 6, or may be to the opposite direction to the engaging element 40 provided on the upper surface side of the substrate portion 21 as in the modification embodiment 7.

The engaging elements 40 are also provided on the lower surface side of the substrate portion 21 as in the molded surface fastener regarding the modification embodiments 6 and 7, whereby the adhering strength of the molded surface fastener to the cushion body 10 can be increased by embedding the engaging elements 40 provided on the lower surface side of the substrate portion 21 into the cushion body 10, for example, when the molded surface fastener is integrated to the cushion body 10 at the same time of foam molding the cushion body 10 shown in FIG. 14, for example. Further, the molded surface fastener regarding the modification embodiments 6 and 7 can be used in different ways from the above Embodiment 1 since the engaging elements 40 are disposed on both upper and lower surfaces of the substrate portion 21.

Embodiment 2

Figure 25:
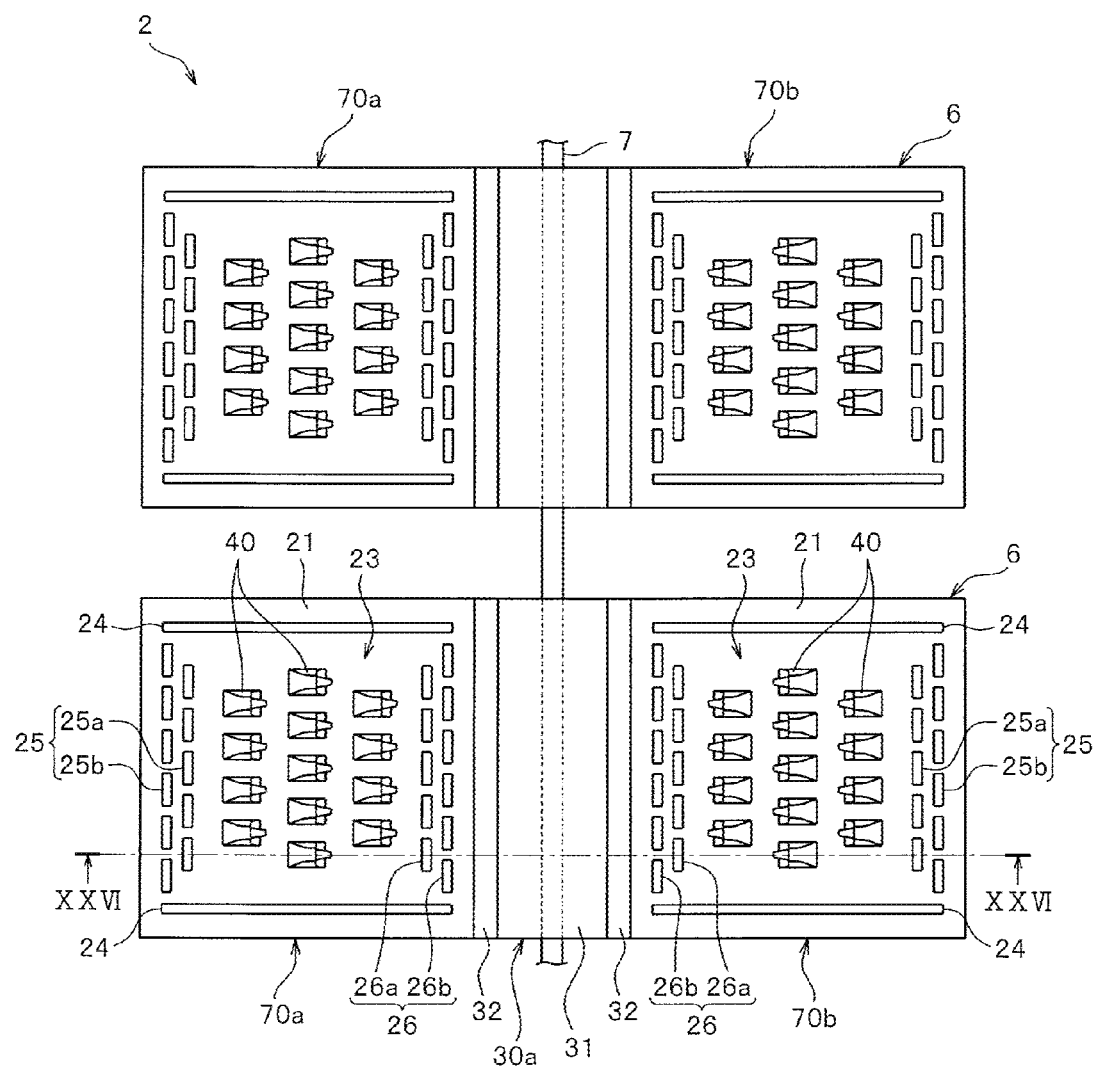
FIG. 25 is a plan view illustrating the molded surface fastener according to Embodiment 2 of the present invention.
Figure 26:
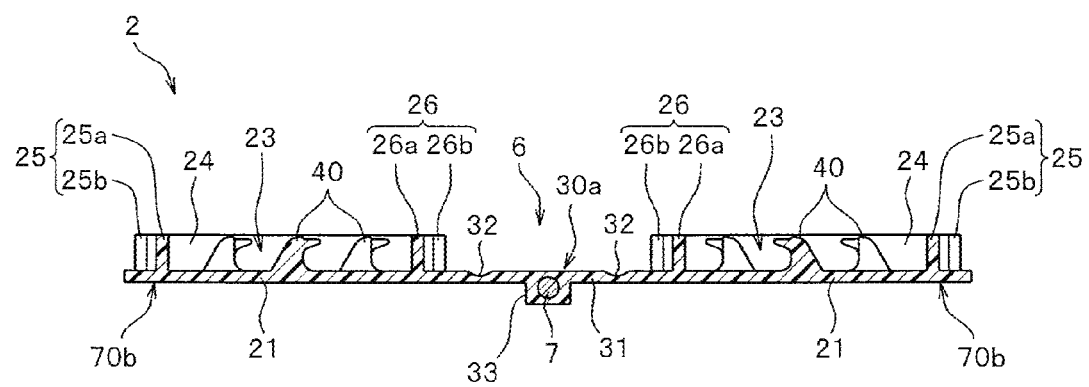
FIG. 26 is a cross-sectional view in XXVI-XXVI line shown in FIG. 25.

FIG. 25 is a plan view illustrating the molded surface fastener according to Embodiment 2 of the present invention. FIG. 26 is a cross-sectional view in XXVI-XXVI line shown in FIG. 25.

It should be noted that, regarding the molded surface fastener 2 according to Embodiment 2 of the present invention shown as follows and the molded surface fasteners 3, 4 according to Embodiments 3 and 4 explained later, the different structures from the molded surface fastener 1 regarding the above Embodiment 1 are mainly explained. The explanation of parts or members having substantially the same structure as the above molded surface fastener 1 are not described but represented with the same reference signs.

The molded surface fastener 2 regarding Embodiment 2 has a plurality of surface fastener units 6 disposed along a length direction and one connecting member 7 fixed to each surface fastener unit 6, and is formed long in the fastener length direction (machine direction).

The plurality of surface fastener units 6 are connected with the connecting member 7 at predetermined intervals with adjacent surface fastener units 6. For the connecting member 7, a string-shaped member such as twisted string or a long member having flexibility such as monofilament is used.

Such a molded surface fastener 2 of Embodiment 2 as above is manufactured by forming the surface fastener unit 6 by molding a material that magnetic particles are mixed in a thermoplastic resin by using the die wheel 51 as shown in FIGS. 7-10 and by inserting and fixing the connecting member 7 to each surface fastener unit 6 in molding the surface fastener unit 6.

Each surface fastener unit 6 has a left and right pair of a first surface fastener portion 70a and a second surface fastener portion 70b and a foldable piece portion 30a disposed continuously between the first and second surface fastener portions 70a, 70b.

The first surface fastener portion 70a and the second surface fastener portion 70b in each surface fastener unit 6 have a symmetrical form mutually with reference to a center part of the foldable piece portion 30a in the width direction when the first and second surface fastener portions 70a, 70b and the foldable piece portion 30a are held in a straight and linear form along the width direction. Accordingly, the first surface fastener portion 70a is mainly explained in Embodiment 2, and the detailed explanation of the second surface fastener portion 70b is not described but represented with the same reference signs as the ones of the first surface fastener 70a.

In Embodiment 2 of the present invention, the first surface fastener portion 70a of the surface fastener unit 6 has a flat plate-shaped substrate portion 21, a plurality of hook-shaped engaging elements 40 standing on an upper surface of the substrate portion 21 and forms an engaging region 23, a pair of lateral barrier portions 24 standing along the width direction and having the engaging region 23 between them on the upper surface of the substrate portion 21 at a front end edge part and an rear end edge part, outer side vertical barrier portion 25 standing on an outer side end edge portion opposite to a foldable piece portion 30a side of the substrate portion 21 along a length direction, and inner side vertical barrier portion 26 standing on an inner side end edge portion on the foldable piece portion 30a side of the substrate portion 21 along the length direction.

It should be noted that the substrate portion 21, the engaging element 40, the lateral barrier portion 24, the outer side vertical barrier portion 25, and the inner side vertical barrier portion 26 in the first surface fastener portion 70a in Embodiment 2 are formed substantially to be the same as the substrate portion 21, the engaging element 40, the lateral barrier portion 24, the outer side vertical barrier portion 25, and the inner side vertical barrier portion 26 in the first surface fastener portion 20a in the above Embodiment 1.

The foldable piece portion 30a in Embodiment 2 has a flat plate-shaped base portion 31, a hinge portion 32 disposed on left and right side edge parts of the base portion 31 and a fixing portion 33 which is disposed on a lower surface side of the base portion 31 and fixes the connecting member 7. The base portion 31 and the hinge portion 32 of the foldable piece portion 30a in Embodiment 2 are formed substantially to be the same as the base portion 31 and the hinge portion 32 of the foldable piece portion 30 in the above Embodiment 1.

The fixing portion 33 of the foldable piece portion 30a has a shape which is a rectangular cross-sectional surface, and is formed so as to protrude from the lower surface of the base portion 31. This fixing portion 33 encompasses the connecting member 7 inside and fixes it with the foldable piece portion 30a integrally. This fixing portion 33 is provided over the whole length direction in the foldable piece portion 30a.

The connecting member 7 in Embodiment 2 is fixed to the foldable piece portion 30a of each surface fastener unit 6 so as to penetrate into the fixing portion 33 in the length direction. A plurality of surface fastener units 6 are connected by this connecting member 7 at a predetermined interval each other. In this case, a distance of the interval between each surface fastener unit 6 is not particularly limited. Though, for example, it is preferable that the distance is set to an extent that when the molded surface fastener 2 is bent to a predetermined curvature in the left and right direction so that the connecting member 7 is curved, the adjacent surface fastener units 6 are not interfered with each other.

In such a molded surface fastener 2 in the above Embodiment 2, as in the case of the above Embodiment 1, magnetic particles composed of an alloy of iron, cobalt, nickel and others are mixed in a synthetic resin (or a composite of synthetic resin and elastomer) forming the molded surface fastener 2. Particularly in Embodiment 2, the magnetic particles are mixed in the whole surface fastener unit 6 including the engaging element 40 and each barrier portion 24-26 homogeneously.

In such a molded surface fastener 2 in the above Embodiment 2, not only the same effect as in the molded surface fastener 2 in Embodiment 1 can be obtained, but also the molded surface fastener 2 can be easily bent in the fastener width direction or the height direction at a part in which the connecting member 7 is exposed outside since a plurality of surface fastener units 6 are connected by the connecting member 7 in a state of parting at a predetermined interval.

Owing to this, for example when the molded surface fastener 2 in Embodiment 2 is attached to a fastener holding portion 15a of the molding die 15 as shown in FIG. 12, even if the fastener holding portion 15a is formed to curve in the width direction, the molded surface fastener 2 can be stably held at the curved fastener holding portion 15a while making the molded surface fastener 2 curved along the curved-form of the fastener holding portion 15a. Accordingly, the cushion body 10 in which the molded surface fastener 2 in Embodiment 2 is integrated to the curved-form groove portion for fixing a skin material 10a can be easily obtained.

Figure 27:
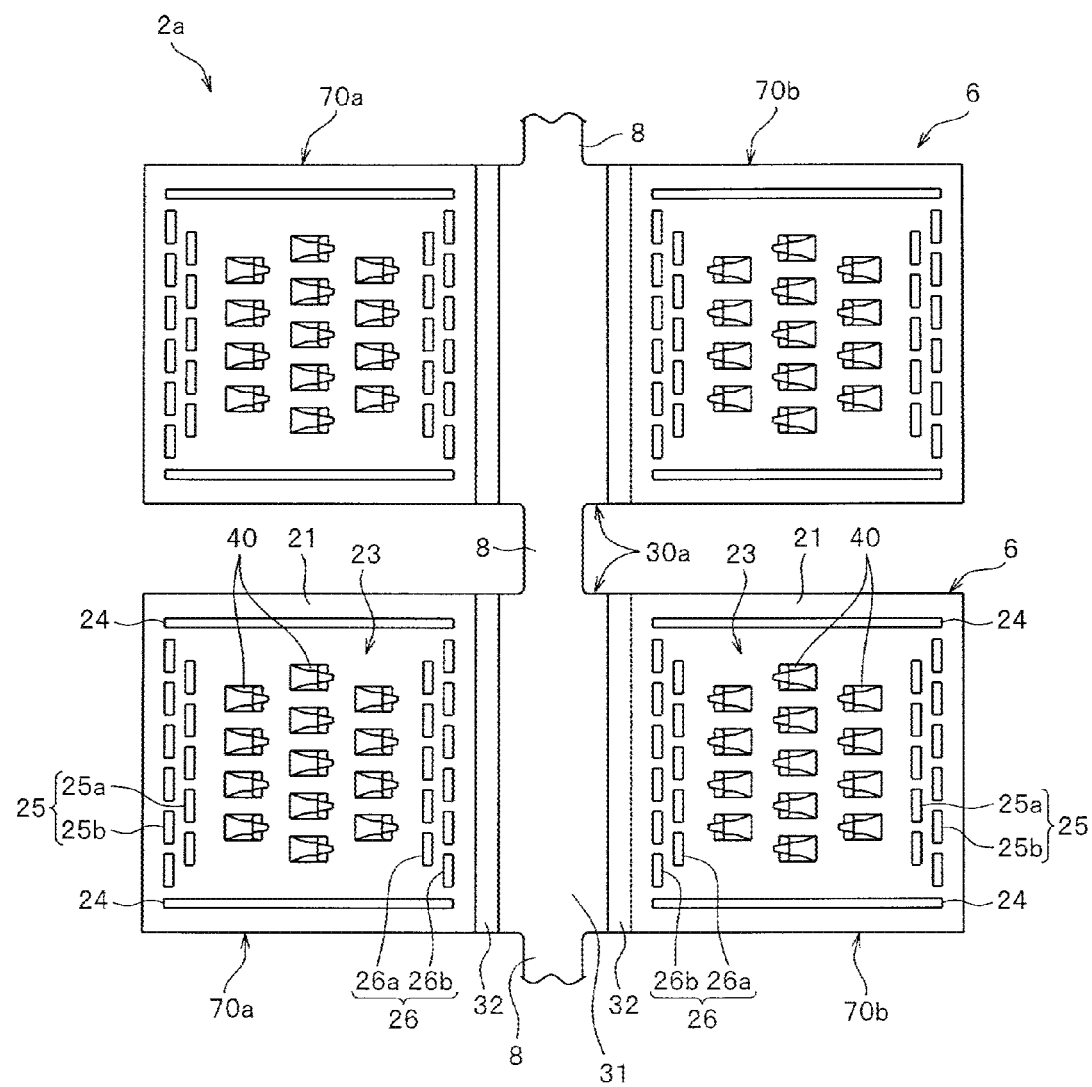
FIG. 27 is a plan view illustrating the molded surface fastener according to a modification embodiment of Embodiment 2 of the present invention.

It should be noted that, in the molded surface fastener 2 in the above Embodiment 2, a plurality of surface fastener units 6 having the first and second surface fastener portions 70a, 70b and the foldable piece portion 30a are connected each other by one connecting member 7. Though, in the present invention, as the modification embodiment of Embodiment 2 is shown in FIG. 27 for example, the molded surface fastener 2a can be also formed by connecting a plurality of surface fastener units 6 by a narrow connecting portion 8 made of synthetic resin and formed integrally to the foldable piece portion 30a instead of the connecting member 7.

In this case, each connecting portion 8 connecting a plurality of surface fastener units 6 has flexibility, and the molded surface fastener 2a is formed so as to be able to curve in the width direction or the height direction at the connecting portion 8. Owing to this, as in the above Embodiment 2, even if the fastener holding portion 15a of the molding die 15 is formed so as to curve in the width direction, the molded surface fastener 2 regarding this modification embodiment can be stably held at the fastener holding portion 15a.

Embodiment 3

Figure 28:
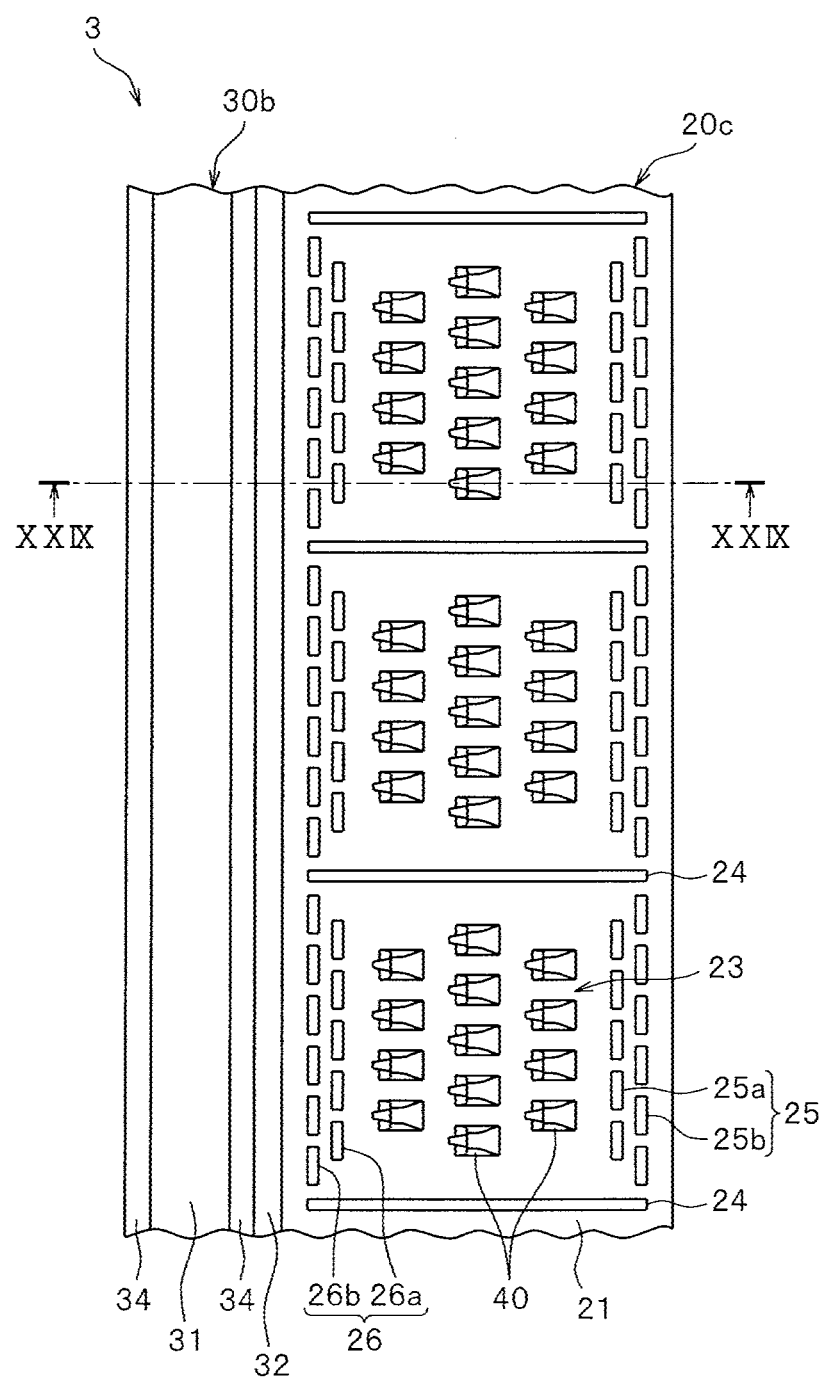
FIG. 28 is a plan view illustrating the molded surface fastener according to Embodiment 3 of the present invention.
Figure 29:
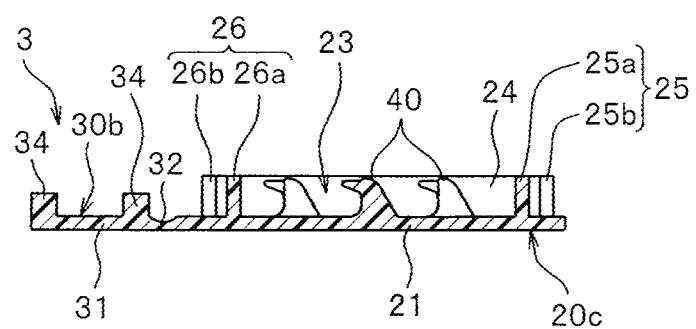
FIG. 29 is a cross-sectional view along the line XXVI-XXVI line shown in FIG. 28.

FIG. 28 is a plan view illustrating the molded surface fastener according to Embodiment 3 of the present invention. FIG. 29 is a cross-sectional view in XXVI-XXVI line shown in FIG. 28.

The molded surface fastener 3 in Embodiment 3 has a structure in which the first surface fastener portion 20a is deleted from the molded surface fastener 1 in the above Embodiment 1, and a left and right pair of projected portions for positioning 34 are added to the foldable piece portion 30.

Specifically, the molded surface fastener 3 in Embodiment 3 has a surface fastener portion 20c extending in a fastener length direction and a foldable piece portion 30b extending from one end edge part of a width direction in the surface fastener portion 20c in the width direction. The surface fastener portion 20c in Embodiment 3 itself is formed to be the same as the second surface fastener portion 20b in the above Embodiment 1.

The foldable piece portion 30b in Embodiment 3 has a flat plate-shaped base portion 31, a hinge portion 32 disposed on an end edge part of the surface fastener portion 20c side of the base portion 31, a pair of left and right projected portions for positioning 34 protruded on an upper surface of the foldable piece portion 30b.

Figure 30:
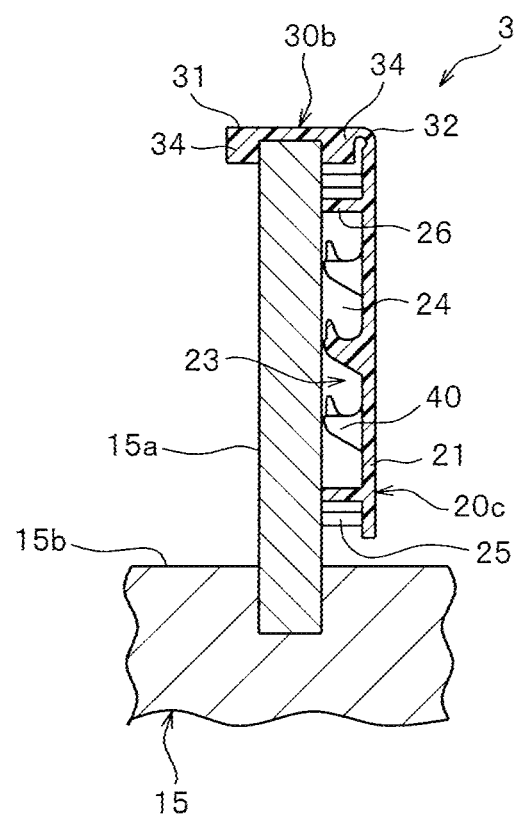
FIG. 30 is a schematic view illustrating a state that the molded surface fastener is held at the fastener holding portion of the molding die.

The pair of left and right projected portions for positioning 34 stand on the base portion 31 along the fastener length direction, and an interval between the pair of left and right projected portions 34 is set to be approximately the same size as a dimension of an top end part of the fastener holding portion 15a of the molding die 15 shown in FIG. 30 in the width direction. It should be noted that the pair of projected portions 34 provided on the foldable piece portion 30b may be disposed on the whole range in the length direction of the foldable piece portion 30b as in Embodiment 3, or only on a partial range in the length direction.

If the molded surface fastener 3 in Embodiment 3 has such a pair of left and right projected portions for positioning 34, when the molded surface fastener 3 is held at the fastener holding portion 15a of the molding die 15 formed to be the same as in a case of the above Embodiment 1, the positioning of the molded surface fastener 3 with respect to the fastener holding portion 15a can be stably and certainly set by fitting the top end part of the fastener holding portion 15a between the pair of left and right projected portions 34 provided on the foldable piece portion 30b and placing the foldable piece portion 30b upon the fastener holding portion 15a as shown in FIG. 30.

Further, in the molded surface fastener 3 in Embodiment 3, after the foldable piece portion 30b is placed upon the top end part of the fastener holding portion 15a as above, the surface fastener portion 20c in which the magnetic particles are mixed is attracted to the magnet of the fastener holding portion 15a, whereby folded automatically at the hinge portion 32 of the foldable piece portion 30b as a center, and attracted and fixed to the side wall surface of the fastener holding portion 15a. Owing to this, the molded surface fastener 3 in Embodiment 3 is held at a predetermined position of the fastener holding portion 15a of the molding die 15 in a predetermined adhered state.

Then, the foam resin material is injected and infused into the molding die 15 in which the molded surface fastener 3 is held at the fastener holding portion 15a, whereby the cushion body 10 in which the molded surface fastener 3 in Embodiment 3 is fixed to a predetermined position of the groove portion for fixing a skin material 10a in a state that the engaging element 40 of the surface fastener portion 20c is exposed on one side of an opposing left and right side wall portions of the groove portion for fixing a skin material 10a can be manufactured.

Also in such a molded surface fastener 3 in Embodiment 3, the same effect as in the molded surface fastener 1 in the above Embodiment 1 can be obtained.

Embodiment 4

Figure 31:
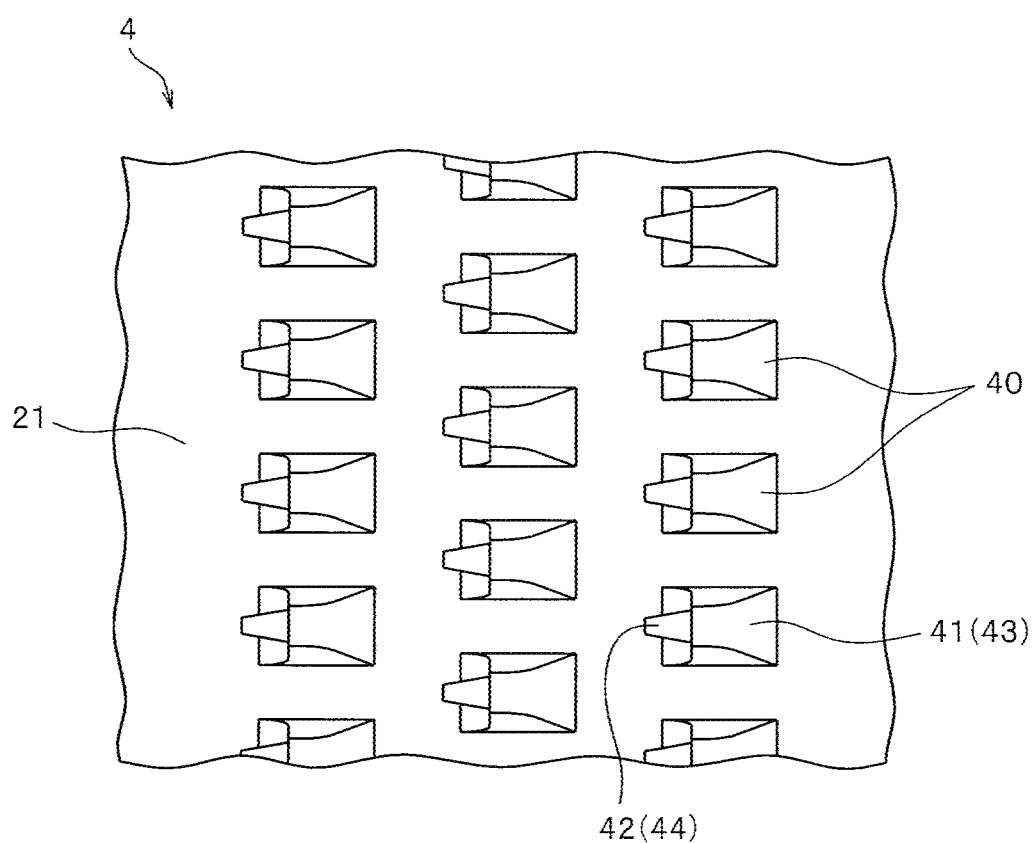
FIG. 31 is a plan view illustrating the molded surface fastener according to Embodiment 4 of the present invention.

FIG. 31 is a plan view illustrating the molded surface fastener according to Embodiment 4 of the present invention.

The molded surface fastener 4 in Embodiment 4 has a flat plate-shaped substrate portion 21 and a plurality of hook-shaped engaging elements 40 standing on an upper surface of the substrate portion 21. The substrate portion 21 in Embodiment 4 is formed so as to be thin flat plate-shaped having a constant board thickness, and an upper surface and a lower surface of the substrate portion 21 are formed to be a flat surface.

Each engaging element 40 in Embodiment 4 is formed to be the same as the engaging element 40 in the above Embodiment 1. The hook portions 42 of all the engaging elements 40 extend from the stem portion 41 toward one direction in a fastener width direction.

Figure 32:
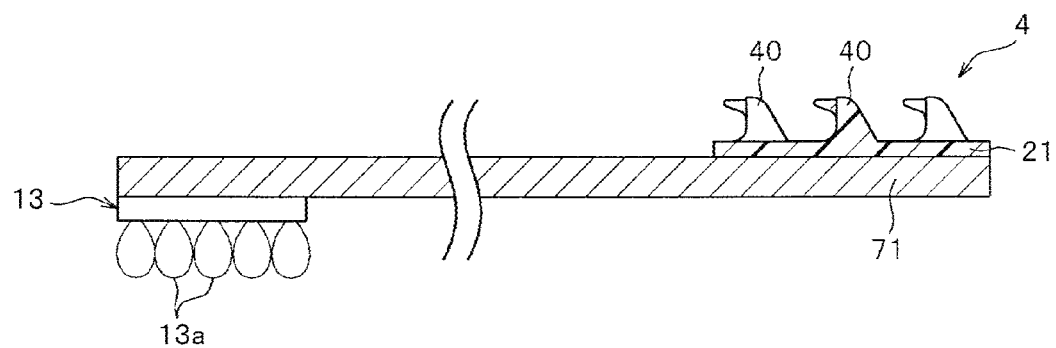
FIG. 32 is a cross-sectional view explaining an example of using the molded surface fastener.

Such a molded surface fastener 4 in Embodiment 4 is preferably used, for example, for a covering member (binding member) 71 covering a wire harness that a plurality of electric wires are bound. For example as shown in FIG. 32, the molded surface fastener 4 in Embodiment 4 is fixed on a first surface (upper surface) of one side edge part of the covering member 71 of the wire harness along a length direction of the covering member 71. It should be noted that means to fix the molded surface fastener 4 to the covering member 71 is not limited in particular, and adhesion means or welding means and the like can be used.

Further, the female engaging member 13 having a plurality of loop-shaped engaging elements 13*a* is fixed on a second surface (lower surface) of the other side edge part of the covering member 71 along the length direction of the covering member 71.

The covering member 71 to which such a molded surface fastener 4 in Embodiment 4 is fixed encompasses the wire harness inside, and the left and right side edge parts of the covering member 71 are overlapped so that the molded surface fastener 4 and the female engaging member 13 face to each other, whereby the female engaging member 13 is fixes to the molded surface fastener 4, and the left and right side edge parts of the covering member 71 can be closed mutually.

Owing to this, the wire harness is bound by the covering member 71, and a state that a plurality of electric wires are bound can be stably retained. Further, the covering member 71 is cinched stronger in a state that the left and right side edge parts of the covering member 71 are closed mutually by the molded surface fastener 4 and the female engaging member 13, whereby the female engaging member 13 is fixed to the molded surface fastener 4 in such a cinched state, and the wire harness can be bound stronger.

Figure 33:
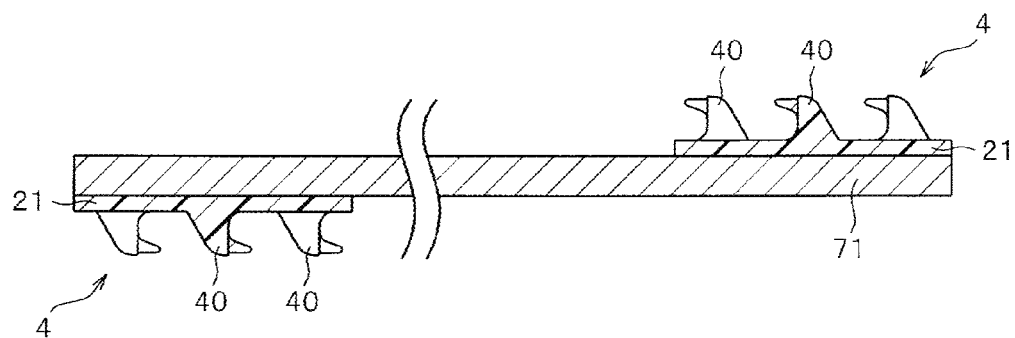
FIG. 33 is a cross-sectional view explaining another example of using the molded surface fastener.

The molded surface fastener 4 in Embodiment 4 can be used by attaching to both the first surface (upper surface) of one side edge part and the second surface (lower surface) of the other side edge part of the covering member 71 of the wire harness, for example as shown in FIG. 33, by increasing a forming density of the engaging element 40 or increasing the element width dimension of the engaging element 40 as in the modification embodiment 3 of Embodiment 1 (see FIG. 19), for example.

Owing to this, the wire harness is encompassed inside the covering member 71, and the left and right side edge parts of the covering member 71 are overlapped so that the molded surface fasteners face to each other, whereby it becomes possible that the left and right side edge parts of the covering member 71 are closed mutually by fixing the molded surface fasteners 4 mutually.

Figure 34:
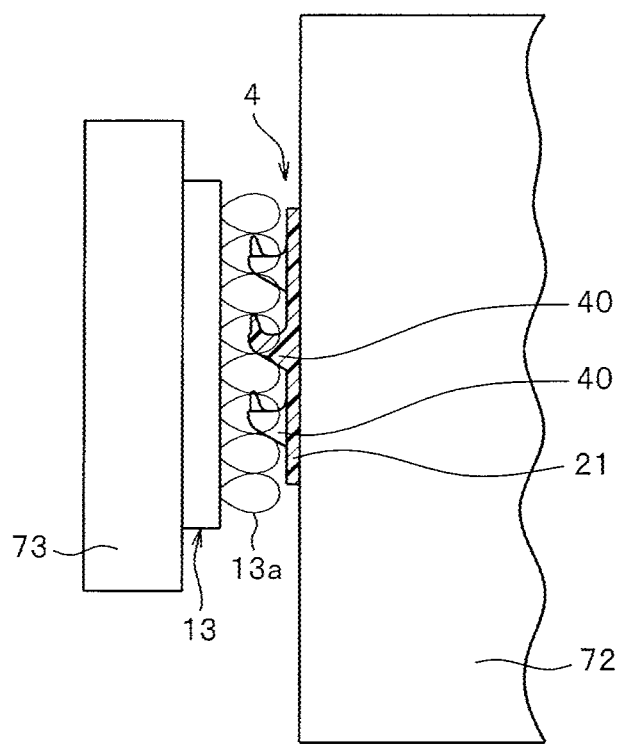
FIG. 34 is a cross-sectional view explaining another example of using the molded surface fastener.
Figure 35:
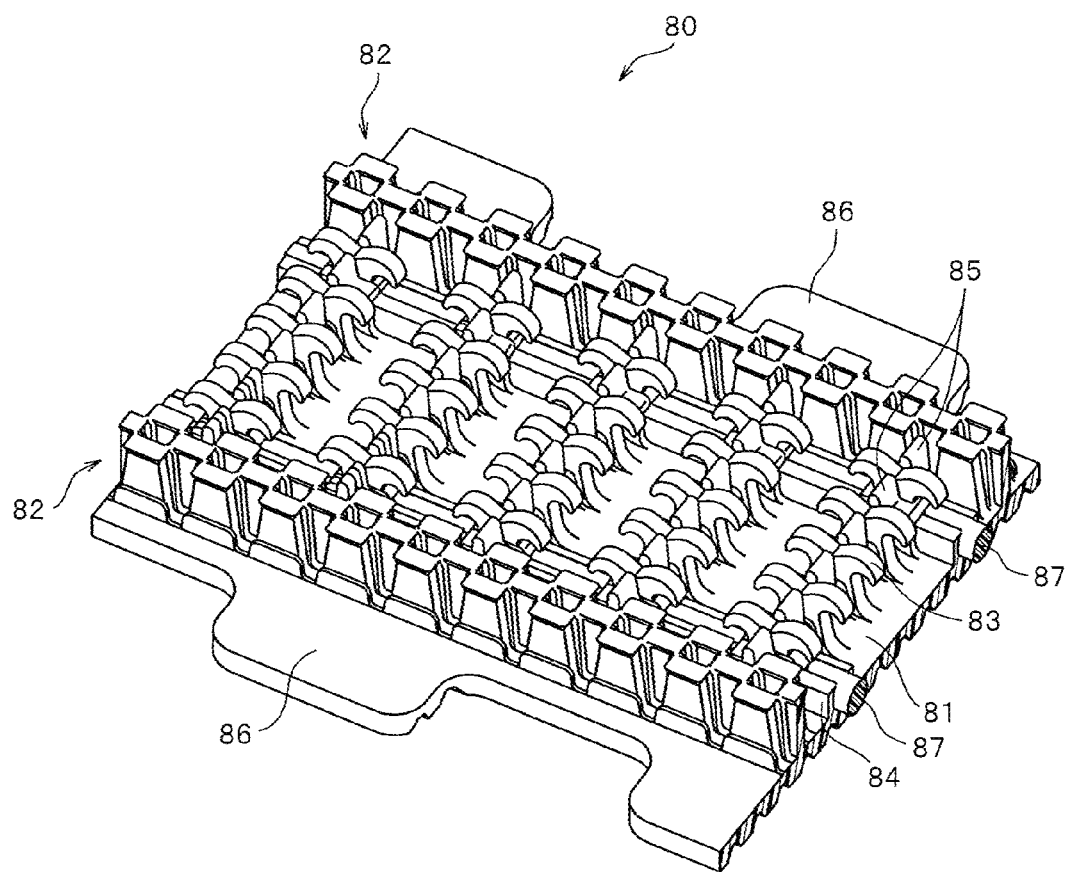
FIG. 35 is a perspective view illustrating a conventional molded surface fastener.
Figure 36:
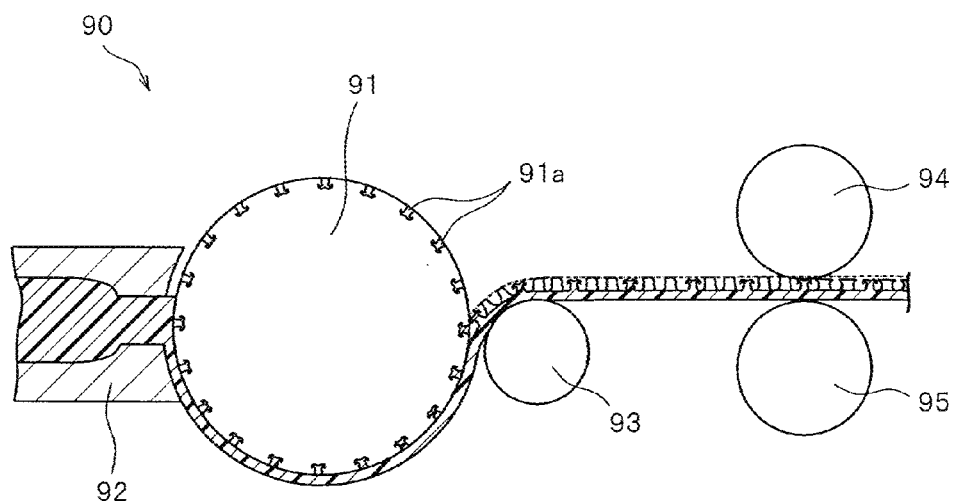
FIG. 36 is an explanatory view explaining a molding process of the conventional molded surface fastener schematically.
Figure 37:
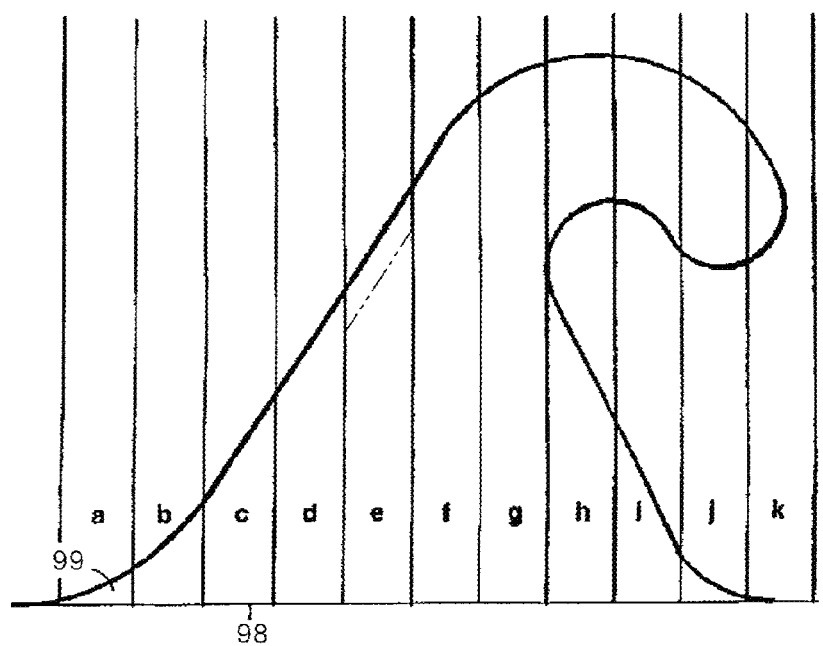
FIG. 37 is a cross-sectional view illustrating a main part of a die wheel molding the conventional molded surface fastener.

Furthermore, the molded surface fastener 4 in Embodiment 4 is preferably used in such a case that a hard product 73 and the like is fixed to a wall 72 and the like, for example as shown in FIG. 34. For example, in a case where a soft product is fixed to the wall 72, the product can be fixed to the wall 72 relatively easily since the product itself is bent or flexible. However, in a case where a hard product 73 is fixed to the wall 72, the product is sometimes difficult to fix because of a stiffness of the product 73.

On the other hand, by attaching the molded surface fastener 4 in Embodiment 4 to the wall 72 or the product 73 while attaching the female engaging member 13 having a plurality of loop-shaped engaging elements 13*a* to the product 73 or the wall 72, the hard product 73 can be stably fixed to the wall 72.

When the product 73 is detached from the wall 72, the product 73 can be easily detached by moving the product 73 upward with respect to the wall 72. Particularly the molded surface fastener 4 in Embodiment 4 is effective in such a case that the product 73 which is long in the width direction is attached to the wall 72.

Further, the molded surface fastener 4 in Embodiment 4 can be preferably used to a supporter for a waist or a diaper.

That is, in the molded surface fastener 4 in Embodiment 4, the hook portions 42 of all the engaging elements 40 disposed on the molded surface fastener 4 are directed in one direction. Owing to this, for example in using the molded surface fastener 4 in Embodiment 4 to the supporter or the diaper, it becomes possible that when a person wears the supporter or the diaper, the supporter or the diaper is attached to a necessary position in the first place, the female engaging member 13 is fixed to the molded surface fastener 4 in a loose state, then the fixed portion is moved relatively so as to be cinched with a weak force, and the state after cinching can be easily fixed. Owing to this, the wearing state can be easily adjusted and the usability (operatability) can be improved.

REFERENCE SIGNS LIST 1, 2, 2*a* Molded surface fastener
3, 4 Molded surface fastener
6 Surface fastener unit
7 Connecting member
8 Connecting portion
10 Cushion body (Foam body)
10*a* Groove portion for fixing a skin material
11 Skin material
12 Engaged insertion piece portion
13 Female engaging member
13*a* Loop-shaped engaging element
15 Molding die
15*a* Fastener holding portion
15*b* Cavity surface (Inner wall surface)
20*a* First surface fastener portion
20*b* Second surface fastener portion
20*c* Surface fastener portion
21 Substrate portion
23 Engaging region
24 Lateral barrier portion (first barrier portion)
25 Outer side vertical barrier portion (second barrier portion)
  25*a* Inner side barrier row
  25*b* Outer side barrier row
26 Inner side vertical barrier portion (third barrier portion)
  26*a* Inner side barrier row
  26*b* Outer side barrier row
30, 30*a* Foldable piece portion
30*b* Foldable piece portion
31 Base portion
32 Hinge portion
33 Fixing portion
34 Projected portion
40 Engaging element (male engaging element)
41 Stem portion
41*a* Inner side surface
41*b* Outer side surface
41*c* Front and rear end surfaces
41*d* Upper end surface
42 Hook portion
42*a* Lower end surface
42*b* Upper end surface
42*c* Front and rear end surfaces
42*d* Tip end surface
43 Enlarged width portion 44 Narrow width tip end portion
45 Boundary (Dimension boundary part)
46 Reference surface (First reference surface) or Boundary surface (First boundary surface)
47 Reference surface (Second reference surface) or Boundary surface (Second boundary surface)
48 Stem main body portion
49 Hem portion
50 Manufacturing apparatus
51 Die wheel
52 Extrusion nozzle
53 Pickup roll
55 Cavity space
55a Cavity space of a stem main body portion
55b Cavity space of a hem portion
55c Cavity space of a hook portion
56 Plate
56a First plate
56b Second plate
57 Parting line
58 Parting surface
59a Opening of a cavity space of a stem main body portion
59b Opening of a cavity space of a hem portion
59c Opening of a cavity space of a hook portion
60 Engaging element
60a, 60b Engaging element
60c, 60d Engaging element
61, 61b Stem portion
61c, 61d Stem portion
62, 62b Hook portion
62c, 62d Hook portion
63 Enlarged width portion
64 Narrow width tip end portion
65 Boundary
66 Reference surface (First reference surface) or Boundary surface (First boundary surface)
66b, 66c Reference surface or Boundary surface
67 Reinforcement rib
70a First surface fastener portion
70b Second surface fastener portion
71 Covering member (binding member)
72 Wall
73 Product
H Height dimension of engaging element
L Dimension of hook portion in a fastener width direction
R Region able to disposing a boundary
W, W' Element width dimension of stem portion on an upper end part
θ1 slope angle of front and rear end surfaces of a stem portion
θ2, θ2' Angle which a lower end surface of a hook portion and an upper surface of a substrate portion form
θ3 Angle which an upper end surface of a hook portion and an upper surface of a substrate portion form

The invention claimed is:

1. A molded surface fastener including a flat plate-shaped substrate portion extending in a machine direction and a plurality of hook-shaped engaging elements disposed on at least one surface of the substrate portion, each engaging element being provided with a stem portion standing from the substrate portion and a hook portion extending from a side surface of the stem portion to one direction of a machine intersect direction, wherein,
the engaging element has a narrow width tip end portion provided with at least the hook portion and an enlarged width portion provided with only the stem portion, separated by a reference surface extending along the machine direction and a fastener height direction as a boundary,
the enlarged width portion decreases in dimension in the machine direction as it extends away from the substrate portion in the fastener height direction, and
a dimension of the narrow width tip end portion in the machine direction is smaller than a dimension of the enlarged width portion in the machine direction at the boundary.

2. The molded surface fastener according to claim 1, wherein the boundary is disposed within a range from a compartment position comparting the stem portion and the hook portion to an end edge position opposite to an extending direction of the hook portion at a top end surface of the stem portion in the machine intersect direction.

3. The molded surface fastener according to claim 1, wherein the boundary is disposed on a compartment position comparting the stem portion and the hook portion, the whole stem portion is formed of the enlarged width portion, and the whole hook portion is formed of the narrow width tip end portion.

4. The molded surface fastener according to claim 1, wherein the reference surface is formed of a flat surface and disposed on both front and rear sides of the engaging element in the machine direction.

5. The molded surface fastener according to claim 4, wherein the reference surface is disposed on both upper and lower sides of the engaging element in the fastener height direction, and
a height position of a top end surface of the narrow width tip end portion is set to be lower than a height position of a top end surface of the enlarged width portion via the boundary.

6. The molded surface fastener according to claim 1, wherein the stem portion decreases a dimension in the machine intersect direction gradually toward a top end surface.

7. The molded surface fastener according to claim 1, wherein a lower end surface of the hook portion is disposed so as to have an angle of 0° or more and 50° or less with respect to a surface of the substrate portion.

8. The molded surface fastener according to claim 1, wherein the hook portions of all the engaging elements disposed on one substrate portion extend from the stem portion to a same direction of the machine intersect direction.

9. The molded surface fastener according to claim 1, wherein one hook portion or a plurality of the hook portions is/are provided on one stem portion.

10. The molded surface fastener according to claim 1, including a first surface fastener portion having the substrate portion and a plurality of the engaging elements, a second surface fastener portion having the substrate portion and a plurality of the engaging elements and a foldable piece portion which connects between the first surface fastener portion and the second surface fastener portion and has flexibility to be able to fold with respect to the first surface fastener portion and the second surface fastener portion,
wherein the hook portion of each engaging element disposed on the first surface fastener portion and the hook portion of each engaging element disposed on the second surface fastener portion extend from the stem portion toward the foldable piece portion side respectively.

* * * * *

UNITED STATES PATENT AND TRADEMARK OFFICE
CERTIFICATE OF CORRECTION

| | | |
|---|---|---|
| PATENT NO. | : 9,888,746 B2 | Page 1 of 1 |
| APPLICATION NO. | : 15/119167 | |
| DATED | : February 13, 2018 | |
| INVENTOR(S) | : Ryuichi Murasaki et al. | |

It is certified that error appears in the above-identified patent and that said Letters Patent is hereby corrected as shown below:

In the Specification

Column 9, Line 15, after "increased" insert -- . --.

Column 12, Line 63, after "FIG. 1" insert -- . --.

Column 38, Line 18, delete "(operatability)" and insert -- (operability) --, therefor.

Signed and Sealed this
Tenth Day of April, 2018

Andrei Iancu
*Director of the United States Patent and Trademark Office*